(12) United States Patent
Wakayama et al.

(10) Patent No.: US 7,586,436 B2
(45) Date of Patent: Sep. 8, 2009

(54) RADAR DEVICE

(75) Inventors: Toshio Wakayama, Tokyo (JP); Takashi Sekiguchi, Tokyo (JP); Atsushi Okamura, Tokyo (JP); Masayoshi Ito, Tokyo (JP); Takayuki Inaba, Tokyo (JP); Masashi Mitsumoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 215 days.

(21) Appl. No.: 10/567,789

(22) PCT Filed: Sep. 11, 2003

(86) PCT No.: PCT/JP03/11646

§ 371 (c)(1),
(2), (4) Date: Feb. 9, 2006

(87) PCT Pub. No.: WO2005/026769

PCT Pub. Date: Mar. 24, 2005

(65) Prior Publication Data

US 2006/0238405 A1  Oct. 26, 2006

(51) Int. Cl.
*G01S 13/00* (2006.01)
(52) U.S. Cl. .......................... 342/147; 342/56; 342/79; 342/90; 342/107; 342/146
(58) Field of Classification Search .................. 356/79; 342/72
See application file for complete search history.

(56) References Cited

U.S. PATENT DOCUMENTS 5,280,294 A * 1/1994 Hammerquist .............. 342/453
5,729,465 A * 3/1998 Barbaresco .................. 702/76
5,959,571 A 9/1999 Aoyagi et al.
6,018,309 A 1/2000 Mitsumoto et al.
6,204,755 B1 3/2001 Kikuchi (Continued)

FOREIGN PATENT DOCUMENTS

EP  0 981 059 A2  2/2000

(Continued)

OTHER PUBLICATIONS

M.I. Skolnik, Radar Handbook, Second Edition McGraw-Hill Inc., 1990.

(Continued)

*Primary Examiner*—Thomas H Tarcza
*Assistant Examiner*—Timothy A Brainard
(74) *Attorney, Agent, or Firm*—Birch, Stewart, Kolasch & Birch, LLP

(57) ABSTRACT

A radar device separates directions of a plurality of targets, obtained from combinations of antenna beams, with a high accuracy. The radar device includes: a direction calculating unit for calculating a primary direction, which is the direction of a target, from a combination of characterizing quantities calculated by a signal detector from the reception waves of at least two beams that partially overlap, among the beams radiated in the plurality of directions; and a direction integrating unit for, when a plurality of primary directions calculated by the direction calculating unit is present, calculating an integrated direction, which is the true target direction, from an area in which distribution of the plurality of primary directions is a predetermined density or greater, based on the primary directions belonging to the area.

23 Claims, 12 Drawing Sheets

U.S. PATENT DOCUMENTS

| | | | |
|---|---|---|---|
| 6,229,597 B1 | 5/2001 | Kikuchi | |
| 6,249,243 B1 | 6/2001 | Takagi | |
| 6,278,798 B1 * | 8/2001 | Rao | 382/154 |
| 6,380,884 B1 * | 4/2002 | Satou et al. | 342/70 |
| 6,384,769 B1 | 5/2002 | Mitsumoto et al. | |
| RE37,725 E * | 6/2002 | Yamada | 342/72 |
| 6,646,591 B2 * | 11/2003 | Aker et al. | 342/114 |
| 2002/0019089 A1 | 2/2002 | Shimizu et al. | |
| 2002/0190895 A1 * | 12/2002 | Nakanishi et al. | 342/146 |

FOREIGN PATENT DOCUMENTS

| | | |
|---|---|---|
| EP | 1094336 A2 | 4/2001 |
| JP | 5-150036 A | 6/1993 |
| JP | 11-271430 | 10/1999 |
| JP | 2000-028718 A | 1/2000 |
| JP | 2001-116833 | 4/2001 |
| KR | 2000-0069850 A | 11/2000 |

OTHER PUBLICATIONS

I. Ziskind et al., IEEE Transactions on Acoustics Speech and Signal Processing, vol. 36, No. 10, pp. 1153-1560, Oct. 1988.

* cited by examiner

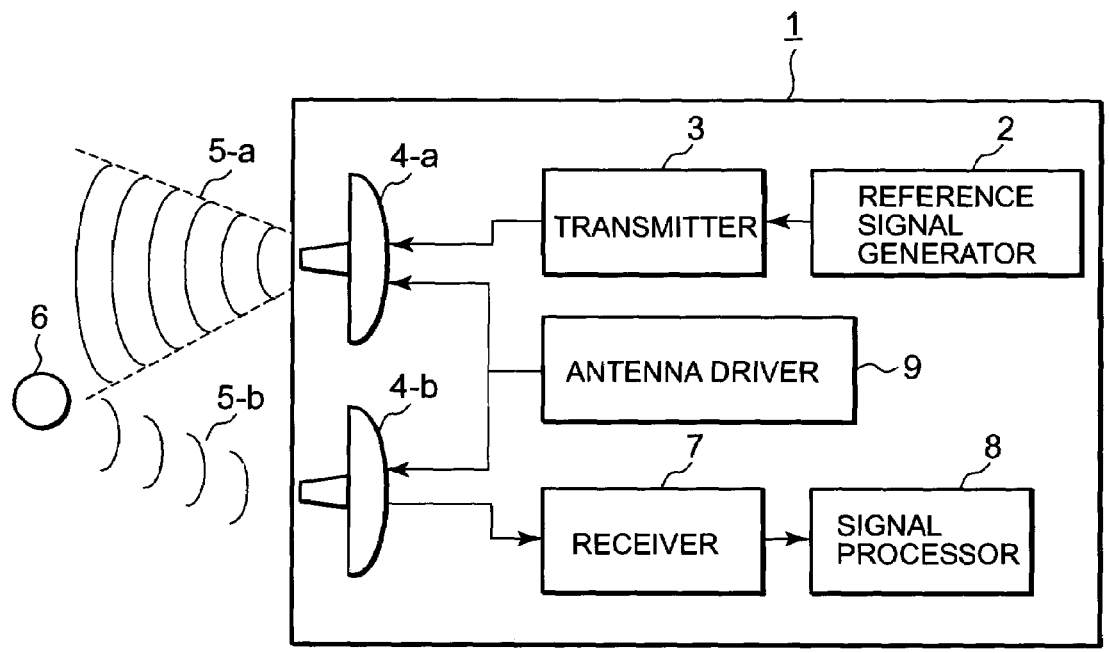
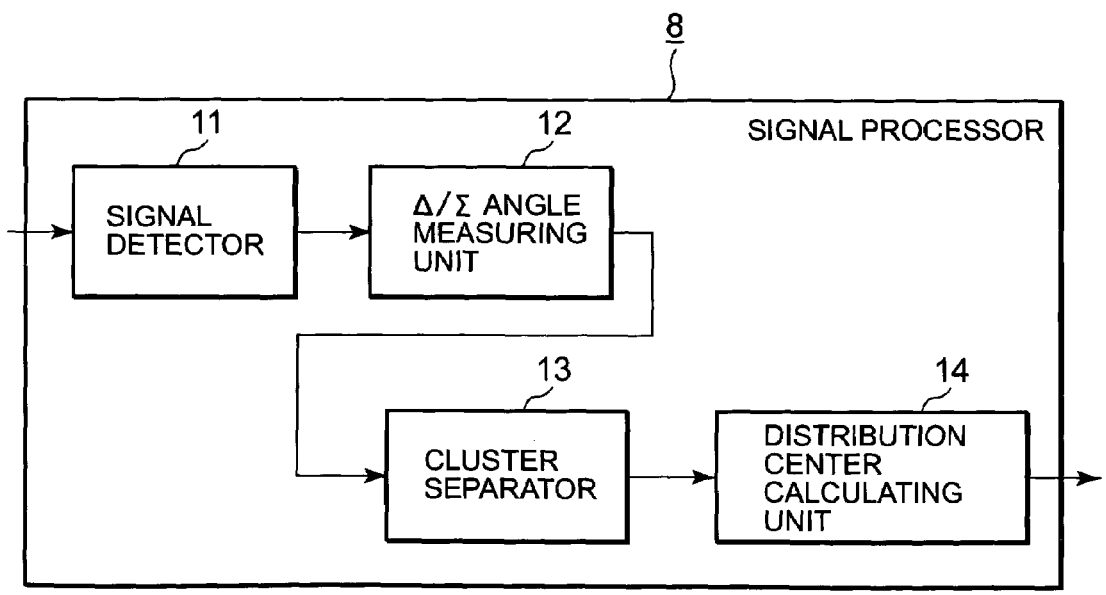

RADAR DEVICE

TECHNICAL FIELD

The present invention relates to radar devices, and particularly to a technology for measuring using a radar the directions in which targets are present.

BACKGROUND ART

Generally, in a radar system, the direction in which a target is present can be obtained by calculating the pointing direction of a beam whose received signal is detectable. The narrower the beam width, the more enhanced the accuracy of measuring the direction of the target. However, when trying to narrow the beam width while keeping the wavelength of a transmission wave of the radar constant, an antenna having a larger aperture diameter is required. Therefore, instead of a method in which the measurement accuracy depends on the beam width, a method of measuring target directions using information such as differences in amplitude or phase of received signals obtained from a plurality of beams whose directions are slightly different from each other has been conventionally used. According to such a method, an angular resolution higher than the measurement accuracy determined from the beam width can be achieved.

As examples of such a method, a sequential-lobing system and a monopulse system have been publicly known. In these methods, firstly, two beams whose directions are adjacent to each other are selected from a plurality of directions of beams. And the difference (referred to as a $\Delta$ signal) in, and the sum ($\Sigma$ signal) of, the amplitudes or phases of received signals observed from the two beams are calculated. Next, the ratio of the $\Delta$ signal and the $\Sigma$ signal is calculated. Assuming that the ratio is referred to as a $\Delta/\Sigma$ value, the $\Delta/\Sigma$ value uniquely corresponds to the angle of the target, so that the direction of the target can be estimated from the $\Delta/\Sigma$ value.

In these methods, however, the number of targets is limited to one. More specifically, there is a problem in that, when a plurality of targets is present within the same beam, the directions cannot be accurately calculated. As illustrated in FIG. 17 for example, considering a radar system for estimating the direction of a target 110 using beams radiated from an antenna 100 to directions 101 through 105 (assuming that the directions 101 and 102, the directions 102 and 103, the directions 103 and 104, and the directions 104 and 105 are respectively adjacent to each other, and the beams to those directions are referred to as beams 101 through 105), regardless of whether or not a true target is present, some sort of angle value would be calculated from each of combinations of a beam 1 and a beam 2, the beam 2 and a beam 3, the beam 3 and a beam 4, and the beam 4 and a beam 5, which are adjacent to each other. Arrows 111, 112, 113, and 114 illustrated in FIG. 18 are examples of the directions of the angle values (images) calculated based on differences in received signals obtained from the beams 101 through 105 in FIG. 17. In the figure, the direction 111 has been calculated from the combination of the beams 101 and 102, and the direction 112 has been calculated from the combination of the beams 102 and 103. In addition, the direction 113 has been calculated from the combination of the beams 103 and 104, and the direction 114 has been calculated from the combination of the beams 104 and 105. Although the direction 113 and the direction 114 are associated with reception waves that result from transmission waves in the beams 103 through 105 radiated toward the target 110 and reflected thereby, the direction 111 and the direction 112 are not associated with the target 110, and are false images that do not correspond to true targets.

Here, when there is only a single target, false images can be rejected based on the amplitude or power of the received signal. However, when there are two or more targets, correlations between the targets and the directions obtained from combinations of beams become complicated, so that simple rejection based on thresholds is not applicable.

As a method of measuring directions of a plurality of targets, a maximum likelihood estimation method (maximum likelihood localization) is disclosed in "Maximum likelihood localization of multiple sources by alternating projection" by I. Ziskind and M. Wax, IEEE Transaction on Acoustics Speech and Signal Processing, vol. 36, no. 10, pp. 1553-1560, October 1988. According to the method, separation of directions is possible even if a plurality of targets is present within a beam. However, this method needs a lot of computation amount, and requires a signal processing unit having a high computing power. In particular, the more the number of targets, the more the computation amount.

As described above, problems have been that the sequential-lobing system and the monopulse system cannot separate the directions of a plurality of targets, and that the maximum likelihood estimation method can separate the directions of a plurality of targets, but computing load is high.

The present invention aims to resolve above-described problems in the existing methods of calculating target directions by combining a plurality of beams.

DISCLOSURE OF THE INVENTION

A radar device relevant to the present invention includes: an antenna for radiating beams in a plurality of directions and for receiving as reception waves the beams having been reflected by targets; a receiver for performing detection processing on the reception waves received by the antenna, to output received signals; a signal detector for extracting from the received signals outputted by the receiver quantities characterizing the reception waves; and a direction calculating unit for calculating a primary direction, being the direction of a target, from a combination of the characterizing quantities calculated by the signal detector based on the reception waves from at least two beams that partially overlap, among the beams radiated in the plurality of directions; and further includes: a direction integrating unit for, when a plurality of primary directions calculated by the direction calculating unit is present, calculating an integrated direction, being the true target direction, from an area in which the density in a distribution of the plurality of primary directions is a predetermined value or greater, the integrated direction calculation being based on the primary directions belonging to the area.

As described above, the radar device is configured so that the true target directions are extracted from each of the areas in which the density in the distribution of the primary directions is a predetermined value or greater. Accordingly, even if a plurality of targets is present, the directions of the targets can be separated.

BRIEF DESCRIPTION OF DRAWINGS

FIG. 1 is a block diagram illustrating the configuration of a radar device according to Embodiment 1 of the present invention;

FIG. 2 is a block diagram illustrating the detailed configuration of a signal processor in the radar device according to Embodiment 1 of the present invention;

BEST MODE FOR CARRYING OUT THE INVENTION

Embodiment 1

Figure 3:
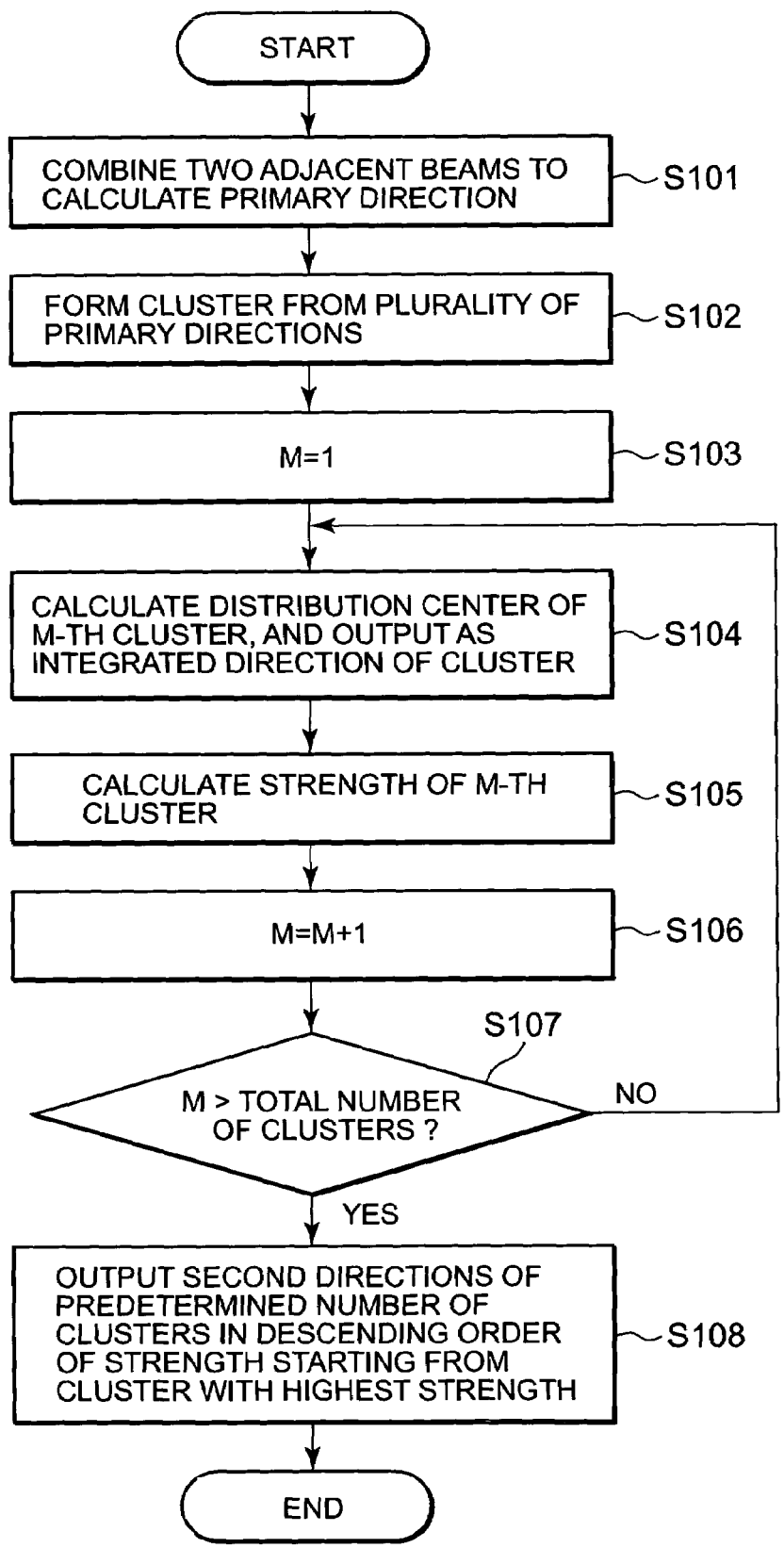
FIG. 3 is a flowchart illustrating the operation of the signal processor in the radar device in Embodiment 1 of the present invention.

FIG. 1 is a block diagram illustrating the configuration of a radar device according to Embodiment 1 of the present invention. In the figure, the radar device 1 is a pulse radar device using a sequential-lobing system, and includes a reference signal generator 2, a transmitter 3, antennas 4-$a$ and 4-$b$, a receiver 7, and a signal processor 8. The reference signal generator 2 is a component for generating a weak reference signal whose frequency is kept constant by a local oscillator. It is assumed that, in the explanations here and hereinafter, a "component" indicates a dedicated circuit or element. However, depending on the case, the device may adopt a configuration in which equivalent processings are performed via computer programs by a general-purpose computer having a central processing unit.

The transmitter 3 is composed of an amplifier and a pulse modulator, and is a component that amplifies by the amplifier the reference signal generated from the reference signal generator 2, and that generates pulse waves from the reference signal by the pulse modulator. The antenna 4-$a$ is an antenna for radiating pulse waves generated by the transmitter 3 as a beam in a predetermined direction. The beam 5-$a$ is a beam radiated by the antenna 4-$a$. A target 6 is present outside the radar device 1, and is an object to be measured by the radar device 1. A radio wave 5-$b$ has been generated from a portion of the beam 5-$a$ reflected by the target 6. The antenna 4-$b$ is an antenna for receiving the beam 5-$b$. The receiver 7 is a component for performing detection processing on reception waves received by the antenna 4-$b$, to output received signals. The signal processor 8 is a component for performing signal processing on the received signals outputted by the receiver 7, to calculate the direction in which the target 6 is present. An antenna driver 9 is a component for mechanically or electronically controlling the directions of the antennas 4-$a$ and 4-$b$. The antennas 4-$a$ and 4-$b$ are controlled by the antenna driver 9 so as to be directed in the same direction.

FIG. 2 is a block diagram illustrating the detailed configuration of the signal processor 6. In the figure, a signal detector 11 is a component for obtaining signal characterizing quantities such as an amplitude from the inputted signal. Moreover, a $\Delta/\Sigma$ angle measuring unit 12 calculates the $\Delta/\Sigma$ value of the characterizing quantities obtained by the signal detector 11, and then calculates from the $\Delta/\Sigma$ value the direction of the target based on each beam. In addition, it is assumed that, in explanations hereinafter, the direction of the target calculated by the $\Delta/\Sigma$ angle measuring unit 12 is referred to as a primary direction. A cluster separator 13 is a component for extracting as a cluster an angle range in which primary directions outputted by the $\Delta/\Sigma$ angle measuring unit 12 are concentrated. When a plurality of angle ranges in which the primary directions are concentrated is present, clusters are formed for each of the angle ranges. A distribution center calculating unit 14 is a component for obtaining the distribution center of the primary directions for each of the clusters formed by the cluster separator 13, to calculate for each cluster the true target direction. Here, it is assumed that the "distribution center" means a value obtained by statistically processing one or more primary directions included in an area in which the distribution density of the primary directions is a predetermined distribution density. In addition, it is assumed that, in explanations hereinafter, the true target direction is referred to as an "integrated direction".

Moreover, the $\Delta/\Sigma$ angle measuring unit 12 is an example of a direction calculating unit, and the cluster separator 13 and the distribution center calculating unit 14 are examples of a direction integrating unit.

Next, the operations of the radar device 1 will be described. Firstly, the reference signal generator 2 generates a weak reference signal, and, based on the weak signal, the transmitter 3 generates pulse transmission waves. The antenna 4-$a$ radiates the pulse transmission waves as the beam 5-$a$. As described earlier, the antennas 4-$a$ and 4-$b$ are configured so as to mechanically or electronically change the beam radiating/receiving direction based on control by the antenna driver 9. Accordingly, the antenna 4-$a$ is oriented in a plurality of directions so that a portion of beams overlap, and sequentially radiates more than one antenna beams in each direction.

The beam 5-$a$ radiated from the antenna 4-$a$ at each time is reflected by the target 6, and a portion of the reflected beam is received by the antenna 4-$b$ as a reception wave. The reception wave received by the antenna 1 is outputted to the receiver 7, and converted from an analog signal into a digital signal (A/D conversion). The conversion result is outputted as a received signal to the signal processor 8. Because the radar device 1 is a pulse radar device using the sequential-lobing system, the radar device calculates the direction of the target 6 using the signal processor 8 by combining antenna beams radiated at different times.

(Method of Calculating Angle from Δ/Σ Value)

FIG. 3 is a flowchart illustrating the processing of the signal processor 6. In step S101, after characterizing quantities of the input signal are detected by the signal detector 11 in the signal processor 6, the Δ/Σ angle measuring unit 12 obtains the Δ/Σ value of the input signal, and calculates a primary direction. As examples of the Δ/Σ value, there are values such as a Δ/Σ value obtained by comparing amplitudes with respect to a plurality of beam patterns regarding the amplitude of the input signal as a characterizing quantity (an amplitude comparing system), and a Δ/Σ value obtained by comparing phases with respect to a plurality of beam patterns regarding the phase of the input signal as a characterizing quantity. Either Δ/Σ value can be used to calculate the direction of the target. For example, when the amplitude comparing system is used, in the received signals with respect to a pair of adjacent beams, an error voltage ε caused by the direction of the target is expressed by the difference (Δ) of the amplitudes, divided by the sum (Σ) of the amplitudes, of the received signals with respect to both the beams. In other words, the relation "ε=Δ/Σ" is satisfied.

Given that the facing direction of the antennas 4-a and 4-b is θa, the direction θo of the target is given as follows.

$$\theta o = \theta a + f(\epsilon) \quad (1)$$

Accordingly, the primary direction of the target can be calculated. In addition, in the equation (1), the function f expresses the relation between the error voltage ε and the deviation from the target direction θa.

Figure 4:
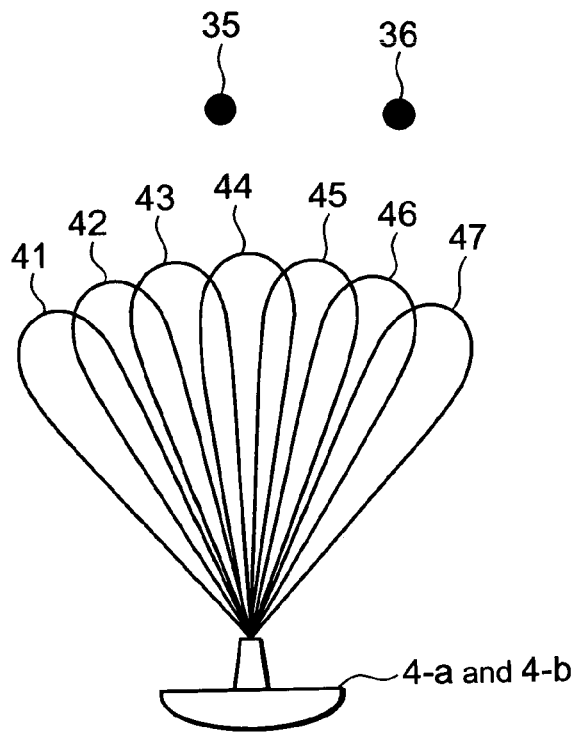
FIG. 4 is a diagram for explaining relations among targets and beams of the radar device according to Embodiment 1 of the present invention.
Figure 5:
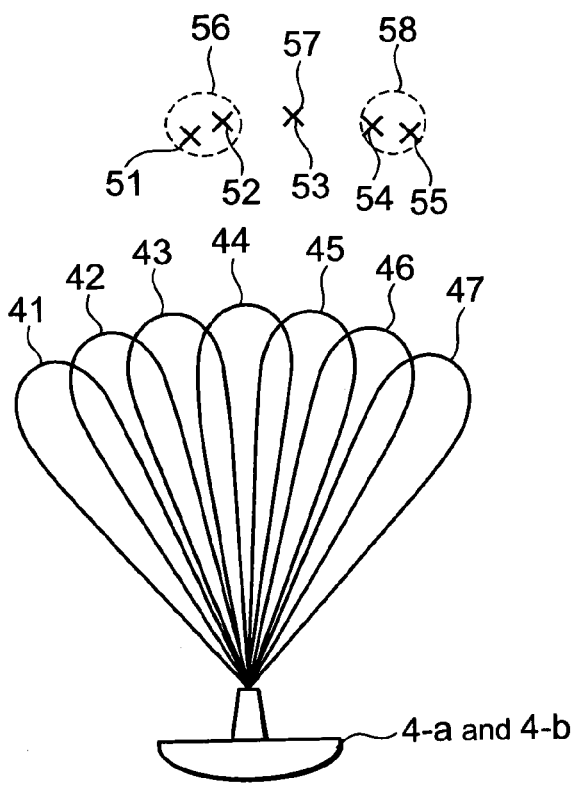
FIG. 5 is a diagram for explaining relations among primary directions and beams of the radar device according to Embodiment 1 of the present invention.

Next, in step S102, the cluster separator 13 forms a cluster based on the distribution of the primary directions calculated by the Δ/Σ angle measuring unit 12. FIG. 4 and FIG. 5 are diagrams conceptually illustrating relations among the true targets, the primary directions calculated by the Δ/Σ angle measuring unit 12, and the clusters formed by the cluster separator 13. When a plurality of targets consisting of true targets 35 and 36 is present, FIG. 4 illustrates a case in which, using beam scanning by the antennas 4-a and 4-b, the directions where the true targets 35 and 36 are present are calculated. As illustrated in the diagrams, the antenna 1 radiates beam patterns 41 through 47. The beam patterns 41 and 42, 42 and 43, 43 and 44, 44 and 45, 45 and 46, and 46 and 47 partially overlap with each other.

Next, FIG. 5 is a diagram illustrating the results of calculating as primary directions, using the beam patterns 41 through 47, the directions in which the true targets 35 and 36 are present. In the diagram, the primary direction 51 has been calculated based on the beam patterns 42 and 43 by the Δ/Σ angle measuring unit 12. In the same manner, the primary direction 52 has been calculated based on the beam patterns 43 and 44, and the primary direction 53 has been calculated based on the beam patterns 44 and 45. Moreover, the primary direction 54 has been calculated based on the beam patterns 45 and 46, and the primary direction 55 has been calculated based on the beam patterns 46 and 47.

Figure 6:
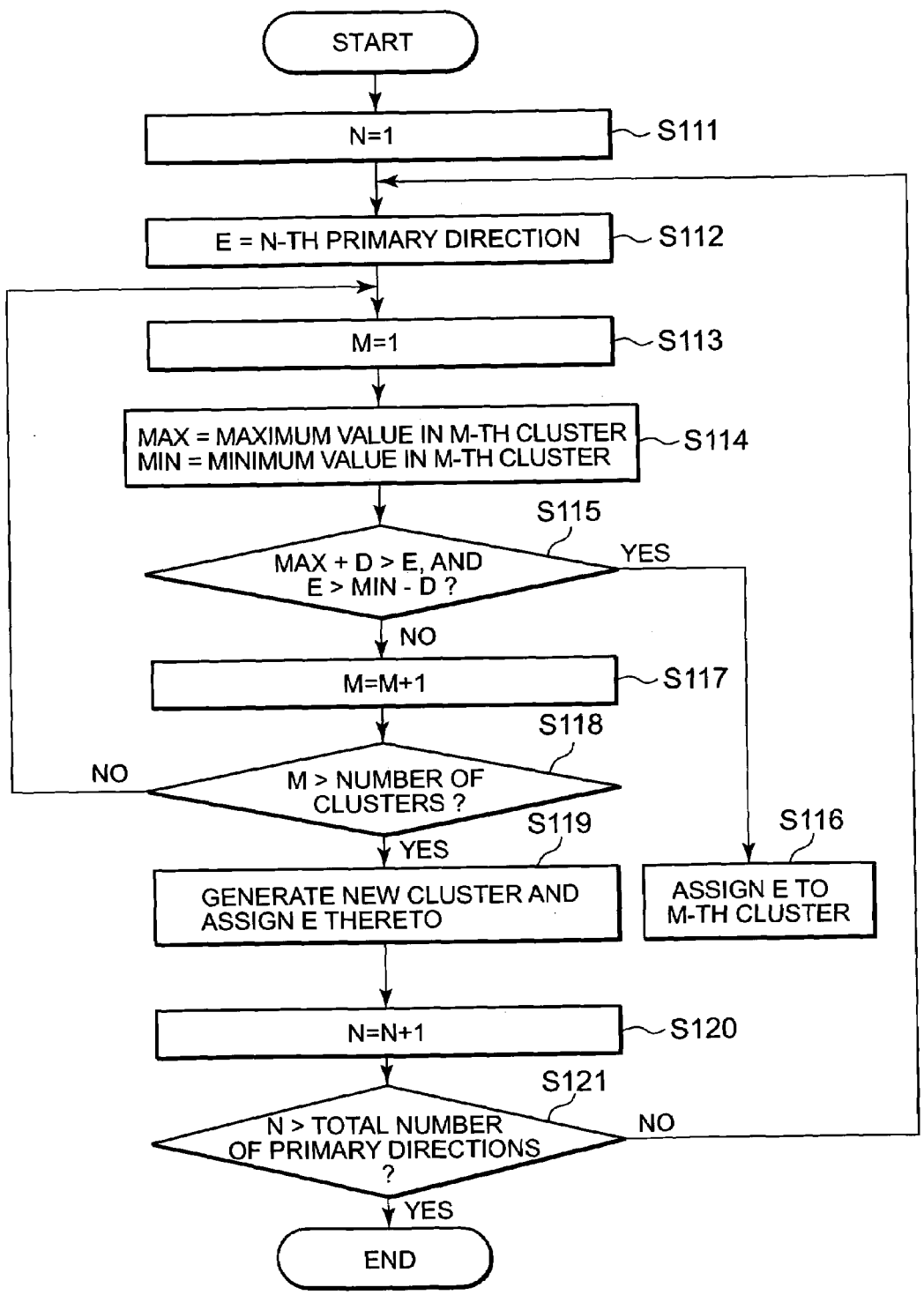
FIG. 6 is a flowchart of clustering processing in Embodiment 1 of the present invention.

The following facts are obvious from FIG. 6.

(1) A single primary direction has been calculated from each of the combinations of the beam patterns.

(2) As the primary directions 51 and 52 for example, even if a plurality of primary directions has been calculated with respect to a true target, the primary directions can be different values.

(3) As the primary direction 53 calculated from the beam patterns 44 and 45, depending on the case, a primary direction might be calculated as if some sort of target is present, although no true target is present in the direction. A primary direction that would be calculated even though no true target is present is referred to as "a primary direction with respect to a false image" (or simply, "the direction with respect to a false image").

Therefore, in order to resolve the problem (2) in particular, the cluster separator 13 clusters the primary directions. In addition, the center distribution calculating unit 14 calculates from each of the clusters formed by the cluster separator 13 the direction with respect to each true target, and eliminates the directions with respect to the false images.

(Details of Clustering Processing)

FIG. 6 is a detailed flowchart of the clustering processing in step S102. The processing is performed by the cluster separator 13. In step S111 in the figure, a counter variable N is set to 1 as an initial value. The counter variable is used to indicate one of the plurality of primary directions calculated by the Δ/Σ angle measuring unit 12. Next, in step S112, an N-th primary direction is assigned to a variable E. As a premise of the processing, it is assumed that the plurality of primary directions calculated by the Δ/Σ angle measuring unit 12 is arranged in a predetermined order, and that a primary direction is uniquely determined by the order from the top. Specifically, each element is uniquely determined by a reference name such as "an N-th primary direction" or "an (N+1)-th primary direction".

In step S113, another counter variable M is also set to 1 as an initial value. When there are clusters that have already been created, the counter variable is used to indicate one of the clusters. It is assumed that, in the same manner as the primary directions, the clusters are arranged in a predetermined order, and are uniquely determined by the order from the top. In step S114, the maximum value in an M-th cluster is stored in a variable MAX, and the minimum value in the M-th cluster is stored in a variable MIN. It is assumed that "the maximum value in a cluster" means the maximum value of the primary directions belonging to the cluster. Meanwhile, it is assumed that "the minimum value in a cluster" means the minimum value of the primary directions belonging to the cluster.

Next, in step S115, whether the variable E (the N-th primary direction) is smaller than the variable MAX (the maximum value in the M-th cluster) added by a predetermined value D (referred to as a condition 1) is checked. At the same time, whether the variable E (the N-th primary direction) is larger than the variable MIN (the minimum value in the M-th cluster) subtracted by a predetermined value D (referred to as a condition 2) is checked. As the result of selections according to the condition 1 and the condition, when the primary directions are arranged in the order of the value sizes of the primary directions, two primary directions that are adjacent to each other and are apart more than a predetermined value from each other come to belong to different clusters. In other words, it is believed that, if the distance to the adjacent primary direction is small, the distribution density of the primary directions is high, and, if the distance is large, the distribution density of the primary directions is low.

In addition, because it is sufficient to form the clusters around points where the distribution density of the primary directions is large, it is obvious that, instead of the clustering method based on distance values between primary directions as described above, the clustering can be performed using other statistical indicators such as a standard deviation.

If both the condition 1 and the condition 2 are satisfied, step S116 ensues (step S115: Yes). In this case, in step S116, the variable E (the N-th primary direction) is assigned to the M-th cluster. After that, step S120 ensues. The following processing will be described later.

Meanwhile, in step ST115, if either the condition 1 or the condition 2 is not satisfied, or if neither the condition 1 nor the condition 2 is satisfied, step S117 ensues (step S115: No). In step S117, the counter variable M is incremented by 1, and then, in step S118, whether or not the variable M is larger than the total number of the clusters that have been currently formed is judged. If the M is larger than the total number of the clusters, it means that no more clusters to be processed are present, so that step S119 ensues (step S118: Yes). In step S119, because a cluster to which the variable E (the N-th primary direction) should belong is not present yet, a new cluster is generated, and the variable E (the N-th primary direction) is assigned to the cluster. After that, step S120 ensues. The following processing will be described later.

Meanwhile, in step S118, if the counter variable M is the total number of the clusters currently formed or smaller, step S114 recurs, to repeat the following processing. Accordingly, if the variable E (the N-th primary direction) should belong to one of the clusters that are already present, the variable E (the N-th primary direction) can be assigned to the cluster by repeating step S114 through step S118, or step S114 through step S116.

Next, the processing in step S120 and thereafter will be described.

In step S120, the counter variable N is incremented by 1. In step S121, if the N has not exceeded the total number of the primary directions, step S112 recurs, to perform the processing for the next primary direction (step S121: No). Meanwhile, if the N has exceeded the total number of the primary directions in step S121, no more primary directions to be processed are present, so that the processing is terminated. This is the end of the clustering processing according to step S102.

(Calculation of Distribution Center)

Next, in step S103 and S104, the distribution center calculating unit 14 calculates the distribution center for each cluster. Firstly, in step S103, the distribution center calculating unit 14 assigns 1 to the counter variable M for initialization. Next, in step S104, the distribution center of the M-th cluster is calculated, which is determined to be the integrated direction of the cluster. The calculation of the distribution center of a cluster is performed as follows. It is assumed that N primary directions $\theta_i$ (i=1, 2, ..., N) obtained from the combinations of different beams currently belong to the M-th cluster. In addition, it is assumed that the amplitude value of the received signal, used in calculating the primary direction $\theta_i$, is $a_i$. Here, the distribution center calculating unit 14 calculates the distribution center $w_M$ of the M-th cluster according to the equation (2).

$$w_M = \frac{\sum_{i=1}^{N} a_i \theta_i}{\sum_{i=1}^{N} a_i} \quad (2)$$

The distribution center given by the equation (2) is a value normalized by dividing the total sum of the values of the primary directions $\theta i$ weighted by the amplitude values of the received signals, by the total sum of the amplitude values of the received signals. Specifically, in the pulse radar, a peak of the amplitude value of the received signal is present around the distance in which a target is present. The larger the peak, the higher the existing probability of a target. Therefore, by increasing the weight of the primary direction calculated based on the received signal, the matching factor between the distribution center and the true target direction is enhanced, so that the accuracy of the angle measurement can be enhanced.

Next, in step S105, the distribution center calculating unit 14 calculates using the equation (3) the strength $a_{cM}$ of the M-th cluster.

$$a_{cM} = \sum_{i=1}^{N} a_i \quad (3)$$

In step S106, the distribution center calculating unit 14 increments the counter variable M by 1, and checks, in step S107, whether the M has exceeded the total number of the clusters. If the M is the total number of the clusters or smaller, there remain clusters to be processed, so that step S104 recurs (step S107: No). Meanwhile, if the M has exceeded the total number of the clusters, step S108 ensues (step S107: Yes).

In step S108, the distribution center calculating unit 14 compares the strengths of the clusters calculated according to the equation (3), and starting from the cluster with the highest strength, a predetermined number of clusters are selected in the descending order of the strength. Then the distribution center of each of the selected clusters is calculated as an integrated direction. As the false image 53 in FIG. 5, a false image is usually isolated from other images. Therefore, the number of the primary directions belonging to the cluster 57 that the cluster separator 13 has formed with respect to the false image 53 is small. Because the strength according to the equation (3) is determined based on the total sum of the amplitude values of the received power used in calculating the primary directions, it is believed that, if the number of primary directions belonging to a cluster is small, the strength thereof is low. Accordingly, by selecting from the clusters the integrated directions whose strengths are high, false images can be eliminated.

In the same manner, the strength can be calculated based on the number of primary directions belonging to the cluster 57. For example, the number of primary directions itself can be the strength of the cluster.

Moreover, because the false image 53 is not an image corresponding to a true target, the amplitudes of the received signals that have formed the false image 53 are smaller than the amplitudes of the received signals of the reception waves that have been received after being reflected by a true target. Therefore, instead of the equation (3) affected by the number of primary directions belonging to a cluster, the strength can be determined based on the mean value of the amplitudes of the received signals with respect to each beam, used in calculating the primary directions belonging to each cluster.

Furthermore, instead of calculating the strength based on the amplitudes, the strength can be calculated based on the value of the power of the received signals of the reception waves with respect to each beam.

It is obvious from the above description that, according to a radar device in Embodiment 1 of the present invention, as a radar device using a sequential-lobing system, angle measurements of a plurality of targets can be performed using a radar originally used for angle measurements of a single target.

In addition, there is a benefit in that highly accurate angle measurements can be performed while preventing false images from being generated.

Moreover, in Embodiment 1 of the present invention, the distribution center value of a cluster has been calculated according to the equation (5), and the distribution center value has been determined as the integrated direction of each cluster. Accordingly, the primary directions calculated based on each beam are averaged out by weighting, so that an effect of reducing errors in measured angle values can be expected. However, instead of such methods, among the beams that have been used as bases for calculating the primary directions of each cluster, the primary direction calculated from the beam having the largest amplitude or the largest power can be used without modification as the integrated direction. In a case in which the S/N ratio of the received signal is high enough, even if the primary direction calculated from the received signal having the largest reception amplitude or power in the cluster is adopted as a measured cluster angle value without modification, a satisfactory angle measurement accuracy can be obtained.

Furthermore, in the present Embodiment 1, a pulse radar device using the sequential-lobing system has been described as an example. However, in a pulse radar device using the monopulse system, only the structure of the antenna and a power-supplying system are different, and the structure of the components for processing received signals is not different from that in the case of a sequential-lobing system, so that the principle of the operations in Embodiment 1 of the present invention is applicable. Therefore, the scope of the present invention is not limited to a pulse radar device using a sequential-lobing system.

In addition, it is obvious that the features of the invention described in Embodiment 1 of the present invention are applicable to a pulse radar device even if the pulse radar device does not use the pulse system. However, as a radar device using the FMCW (frequency modulation continuous wave) system, in a case in which even distance information can be obtained, when forming clusters, the clusters are not formed according to only a condition that angle values (primary directions) of images are close to each other, but the clusters are formed by combining the above condition with a condition that the distances to the images are close, so that the accuracy can be further enhanced.

Embodiment 2

In Embodiment 1, taking a pulse radar device as an example, a method of separating the directions of a plurality of targets by forming clusters based on the distribution density of primary directions, and by selecting the distribution centers of the clusters has been described. However, instead of the method of forming clusters, the primary direction in which the characterizing quantity of the received signal is a local maximum (takes a locally-large value) can be selected as the integrated direction. A radar device according to Embodiment 2 of the present invention has such a feature.

Figure 7:
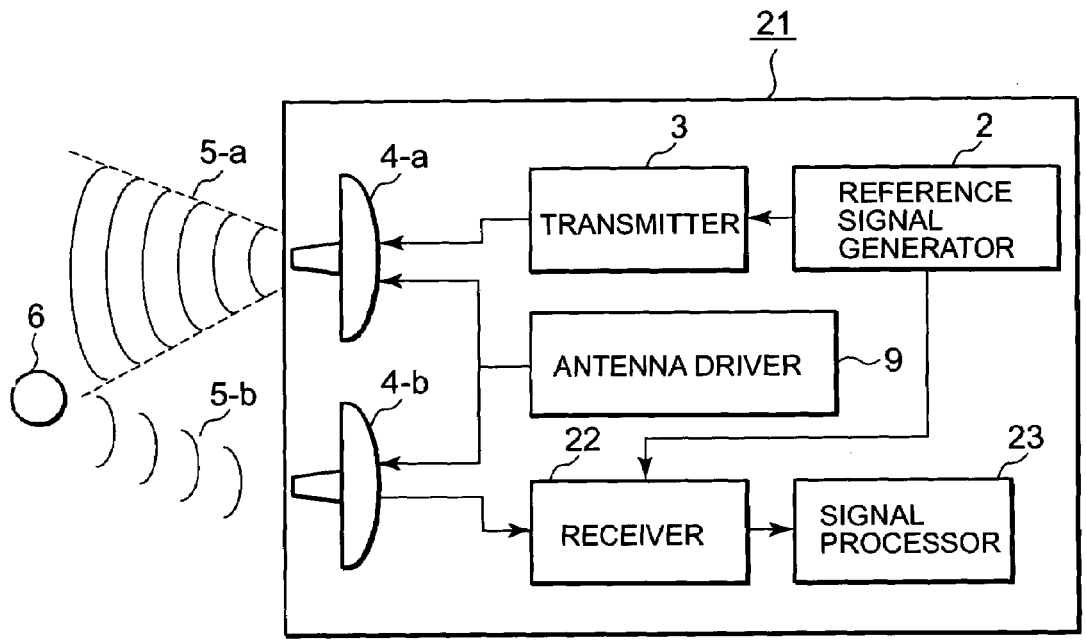
FIG. 7 is a block diagram illustrating the configuration of a radar device according to Embodiment 2 of the present invention.
Figure 8:
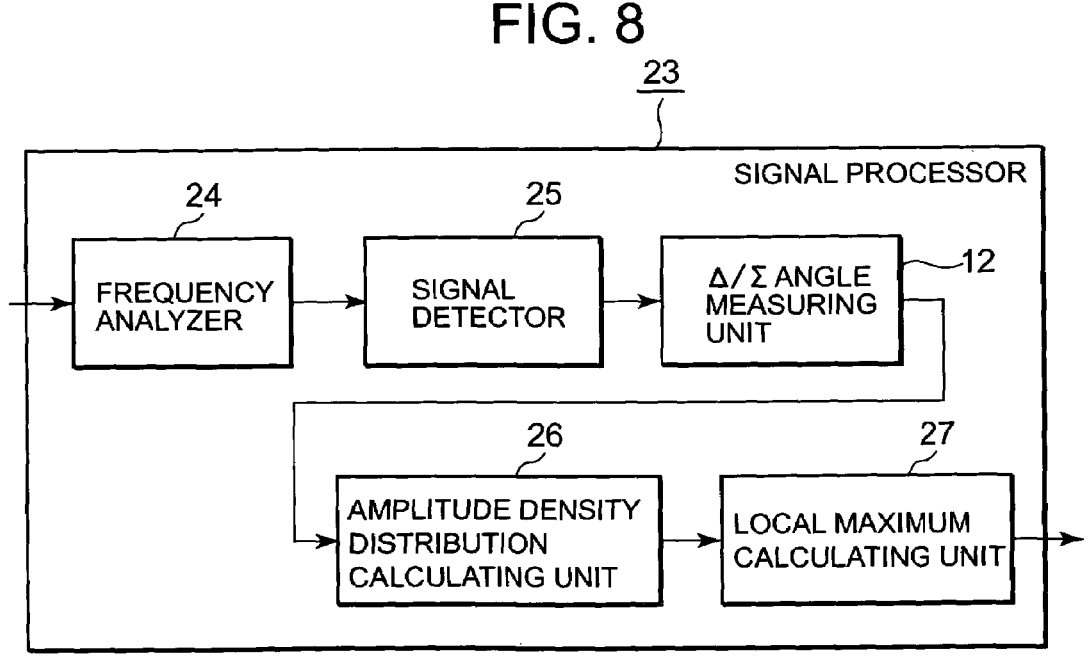
FIG. 8 is a block diagram illustrating the detailed configuration of a signal processor in the radar device according to Embodiment 2 of the present invention.

FIG. 7 is a block diagram illustrating the configuration of the radar device according to Embodiment 2 of the present invention. In the diagram, the radar 21 is a Doppler radar device using a sequential-lobing system, and among the components thereof, components with the same numerals as in FIG. 1 are similar to the corresponding components in the radar device in Embodiment 1, so that the explanations thereof will be omitted. The receiver 22 is a component for frequency-converting the reception waves (analog signals) received by the antenna 4-$b$ into video signals (or intermediate frequency signals) using the reference signals outputted from the reference signal generator 2. In addition, the receiver 22 performs A/D conversion on the received signals that have been frequency-converted, to convert the received signals into digital signals. A signal processor 23 performs signal processing on the received signals digitized by the receiver 22. The detailed configuration thereof is illustrated in FIG. 8.

In the diagram, a frequency analyzer 24 is a component for converting, by the fast Fourier transformation (FFT) for example, the received signal outputted by the receiver 22 into frequency-domain signals, in other words, a spectrum. The beam radiated by the antenna 4-$a$ is reflected by the target 6. When the target 6 is moving, a deviation in frequency arises due to the Doppler effect. It is a feature of the Doppler radar to extract the deviation in frequency to measure the velocity of the target 6. A signal detector 25 is a component for detecting, from the spectrum outputted by the frequency analyzer 24, signal components corresponding to the waves reflected by the target, to detect characterizing quantities (amplitude, power, and the like) thereof. The $\Delta/\Sigma$ angle measuring unit 12 is a component for calculating the primary directions from the quantities characterizing the received signals as in Embodiment 1.

An amplitude density distribution calculating unit 26 is a component for calculating amplitude density distribution for the primary directions calculated by the $\Delta/\Sigma$ angle measuring unit 12. A local maximum calculating unit 27 is a component for calculating the local maximum value of the amplitude density distribution calculated by the amplitude density distribution calculating unit 26.

Next, the operations of the radar device 21 will be described. The operations from the reference signal generator 2 through the receiver 22 are similar to those in Embodiment 1, so that the explanations thereof will be omitted. However, it should be noted that, the radar device 21 is a Doppler radar, so that the Doppler effect arises because the target 6 is moving, whereby a deviation arises in frequency between the transmission wave 5-$a$ and the reflected reception wave 5-$b$.

Next, the receiver 22 frequency-converts the reception waves inputted as analog signals into video signals (or intermediate frequency signals) using the reference signal outputted from the reference signal generator 2. In addition, the receiver performs A/D-conversion on the received signals obtained by the frequency conversion, and outputs the digital signals to the signal processor 23.

Figure 9:
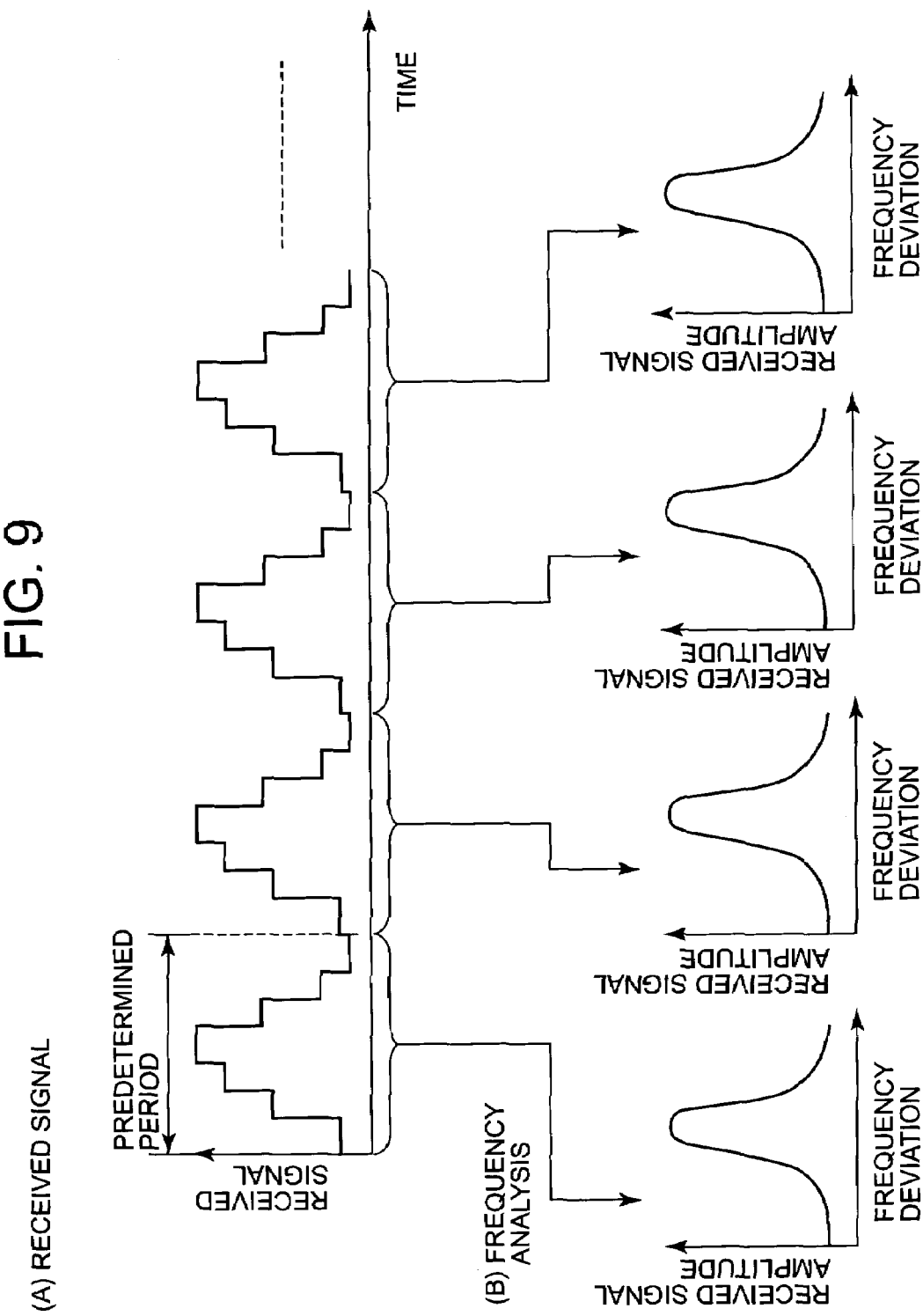
FIG. 9 is a diagram for explaining frequency analysis in the radar device according to Embodiment 2 of the present invention.

In the signal processor 23, the frequency analyzer 24 performs the fast Fourier transformation on the received signals, and outputs for each beam the distribution of the reception amplitude with respect to the frequency deviation, from the received signal during a predetermined period. Specifically, as illustrated in FIG. 9, the received signal ((A) in FIG. 9) is cut out every predetermined period, and frequency analysis is performed on each portion of the signal ((B) in FIG. 9). Moreover, although the distribution of the reception amplitude with respect to the frequency deviation is outputted in the present example, it is obvious that the distribution of the reception power with respect to the frequency deviation can be outputted instead. Furthermore, the reception amplitude and the reception power are examples of characterizing quantities of the received signal, and the distribution of another characterizing quantity with respect to the frequency deviation can be used.

Next, the signal detector 25 extracts, from the frequency vs. reception amplitude distribution outputted by the frequency analyzer 24 every predetermined interval, the frequency (deviation) at which the reception amplitude peaks and the peak reception amplitude, and outputs them to the Δ/Σ angle measuring unit 12. The Δ/Σ angle measuring unit 12 calculates as in Embodiment 1 the Δ/Σ value from the reception amplitudes of a combination of adjacent beam patterns, to output the primary direction.

The amplitude density distribution calculating unit 26 smoothes discretely distributed amplitude values of a plurality of primary directions calculated by the Δ/Σ angle measuring unit 12 to obtain amplitude density distributions. Specifically, given that the reception amplitude value of the antenna beam, used in calculating the primary direction $\theta_k$, is $a_k$, the amplitude density distribution calculating unit 26 calculates the reception amplitude density distribution $A(\theta)$ according to the equation (4).

$$A(\theta) = a_k \delta(\theta - \theta_k) W(\theta) \quad (4)$$

Here, the $\delta(\theta)$ is the Dirac delta function, and the $W(\theta)$ is a window function used in smoothing processing.

Next, the local maximum calculating unit 27 calculates the local maximum value of the $A(\theta)$ from the reception amplitude density distribution $A(\theta)$ calculated according to the equation (4). The $A(\theta)$ in the equation (4) is large around the direction where the primary directions are concentrated. In addition, primary directions calculated from the received signals with respect to beams in which the reflected waves from a plurality of targets do not interfere with each other are approximately the same values as the true target directions, independently of the combinations of beams. Meanwhile, primary directions calculated from the received signals with respect to beams in which the reflected waves from a plurality of targets interfere with each other are different from each other depending on beams used in the calculation. Such a direction is a false image direction, and the primary directions for the false image are sparsely distributed, so that the value of $A(\theta)$ is small. The $A(\theta)$ around the false image does not take a local maximum value, or even if it takes a local maximum, the local maximum value is small. In the meanwhile, the $A(\theta)$ in the direction of a true target is a predetermined value or greater. Accordingly, the direction of a true target can be separated.

Next, the local maximum calculating unit, 27 detects a predetermined number of local maximum values (peaks) of $A(\theta)$, and then outputs the values as integrated directions.

It is obvious from the above that, according to the radar device in Embodiment 2, by calculating the amplitude density distribution and the local maximum values thereof, separation of false images can be prevented while true targets can be separated.

Moreover, in the present Embodiment 2, the cluster separation has not been performed. However, as in Embodiment 1, the cluster separation can be performed by providing a component equivalent to the cluster separator 13, to calculate for each cluster the amplitude density distributions according to the equation (4). Furthermore, in that case, after the strength of each cluster is calculated as in Embodiment 1 and the clusters are selected according to the strength, the amplitude density distributions can be calculated.

Embodiment 3

The radar devices according to Embodiment 1 and Embodiment 2 select the integrated directions from the primary directions forming a predetermined distribution density, or calculate the distribution centers, to determine the integrated directions and to separate the directions of a plurality of targets.

In addition to those, after obtaining an integrated direction according to a method as described above, model fitting processing can be performed on the integrated direction, whereby calculation accuracy of target directions can be further enhanced. A radar device according to Embodiment 3 of the present invention has such a feature.

Figure 10:
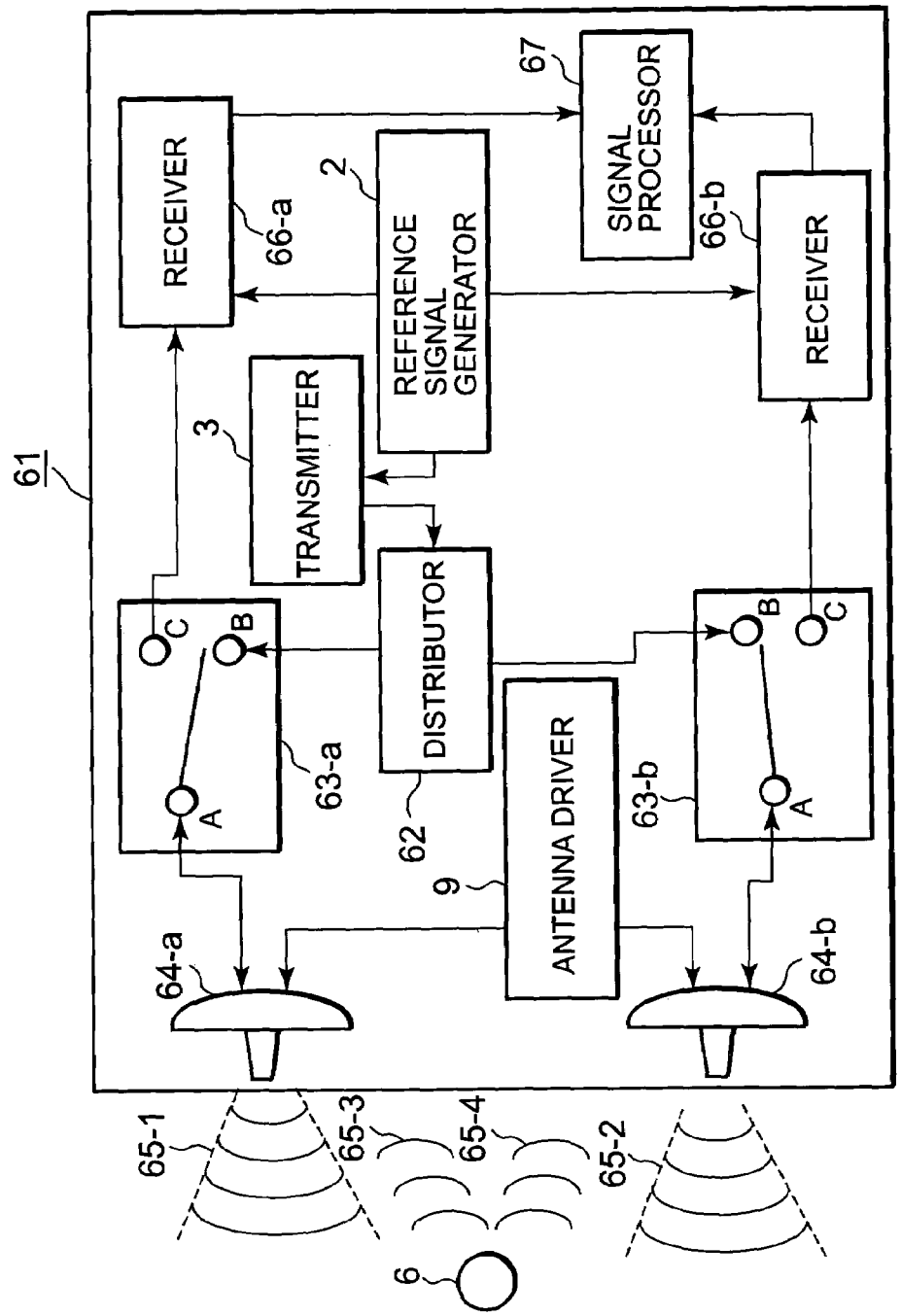
FIG. 10 is a block diagram illustrating the configuration of a radar device according to Embodiment 3 of the present invention.

FIG. 10 is a block diagram illustrating the configuration of the radar device according to Embodiment 3 of the present invention. In the diagram, the radar device 61 is a Doppler radar device using a monopulse system. The reference signal generator 2 and the transmitter 3 are similar to the corresponding components in Embodiment 2, so that the explanations thereof will be omitted. A distributor 62 is a circuit or an element for distributing transmission signals generated by the transmitter 3 to a plurality of destinations. In the example in the diagram, the device is configured so that the signals are distributed to two destinations. A transmission/reception switcher 63-a is a switch that directly connects an antenna 64-a to either of the distributor 62 or a receiver 22, and has a movable terminal A, and contacts B and C. The connection can be switched by a control signal from the external. A transmission/reception switcher 63-b as well as the transmission/reception switcher 63-a is a switch that directly connects an antenna 64-b to either of the distributor 62 or a receiver 22, and also has a movable terminal A, and contacts B and C. In addition, the "movable terminal" described here is not limited to be mechanically movable, but can be configured so that a terminal to be connected is electronically selected.

The antennas 64-a and 64-b are antennas for simultaneously transmitting a transmission wave 65-1 and a transmission wave 65-2 respectively, and for receiving reflected waves 65-3 and 65-4 respectively. Beam patterns of the transmission waves 65-1 and 65-2 are to be radiated so as to partially overlap with each other. The reflected wave 65-3 is a reflected wave generated by a portion of transmission wave 65-1 being reflected by the target 6, and the reflected wave 65-4 is a reflected wave generated by a portion of transmission wave 65-2 being reflected by the target 6. The receivers 66-a and 66-b are similar to the receiver 22 in Embodiment 2, so that the explanations thereof will be omitted. The signal processor 67 is a component for combining at least two lines of received signals, namely via the antenna 64-a and the receiver 66-a, and via the antenna 64-b and the receiver 66-b, to perform angle measurement processing. The detailed configuration thereof is illustrated in a block diagram in FIG. 11.

Figure 11:
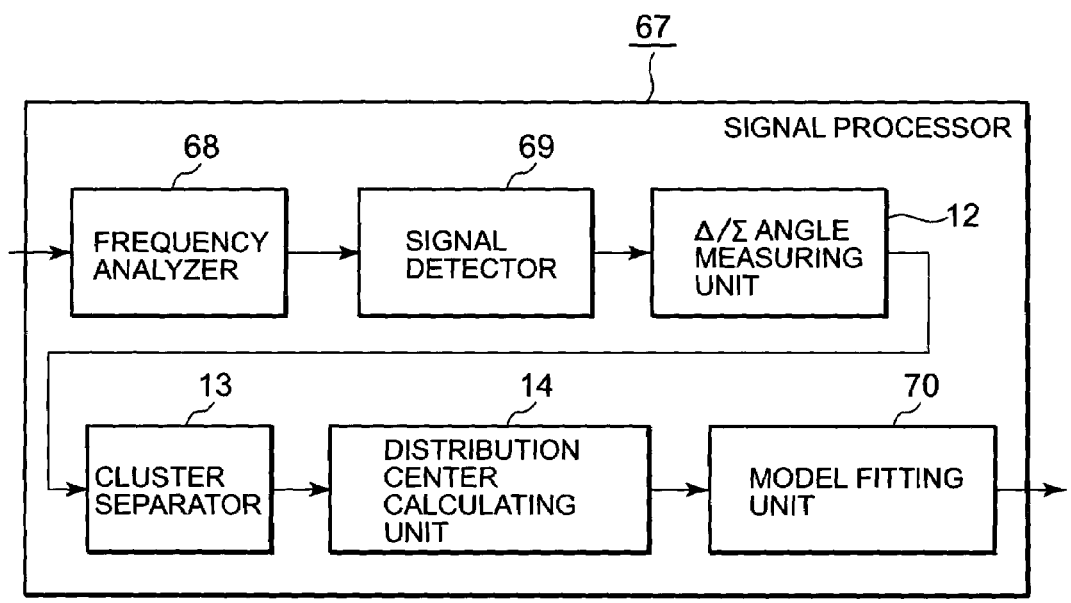
FIG. 11 is a block diagram illustrating the detailed configuration of a signal processor in the radar device according to Embodiment 3 of the present invention.

In FIG. 11, a frequency analyzer 68 is a component corresponding to the frequency analyzer 24 in Embodiment 2, and analyzes frequency deviations due to the Doppler effect. A signal detector 69 is a component for extracting characterizing quantities of the received signal with respect to the frequency deviations analyzed by the frequency analyzer 68. Here, because the radar device 61 is a pulse Doppler radar device, not only the frequency deviations but also arrival delay times of pulse waves must be considered. Specifically, pulse waves radiated from the antennas 64-a and 64-b reach the target 6, are then reflected by the target 6, and return again to the antennas 64-*a* and 64-*b*. In the meantime, the time elapses while the radio waves are traveling along the round-trip distances between the antennas 64-*a* and 64-*b* and the target 6. Thus, distance information is included in arrival times of pulse waves in the received signals in the pulse Doppler radar device, so that the information is extracted as required.

The Δ/Σ angle measuring unit 12, the cluster separator 13, and the distribution center calculating unit 14 are similar to the corresponding components in Embodiment 1, so that the explanations thereof will be omitted. A model fitting unit 70 is a component for checking a model that prescribes the relations among the reflectance ratio, directions, characterizing quantities of the received signal, against characterizing quantities of the received signal and the integrated direction, calculated by the distribution center calculating unit 14, to enhance the accuracy of the integrated direction.

Here, the model fitting unit 70 constitutes a portion of a direction integrating unit.

Next, the operations of the radar device, 61 will be described. Firstly, the reference signal generator 2 generates a weak reference signal whose frequency is kept constant by the local oscillator incorporated therein. The transmitter 3 amplifies the weak reference signal, and performs pulse modulation on the signal, to generate a transmission signal. The transmission signal is transmitted to the transmission/reception switchers 63-*a* and 63-*b* by means of the distributor 62.

The transmission/reception switchers 63-*a* and 63-*b* connect the movable terminals A to the contacts B. Accordingly, the distributor 62 and the antennas 64-*a* and 64-*b* are directly connected, so that the transmission signal (pulse signal) generated by the transmitter 3 is transmitted to the antennas 64-*a* and 64-*b*, and is radiated from the antennas 64-*a* and 64-*b* at the same time, as the transmission waves 65-1 and 65-2, respectively. Because the radar device 61 is a radar device using the monopulse system, by radiating beams as at least two beam patterns at the same time, combinations of beams can be obtained from only a single radiation of the pulse waves. However, in parallel with that, the antenna driver 9 changes the direction of the beams radiated by the antennas 64-*a* and 64-*b* so that a larger number of beam pattern directions than the number of array elements composed of the antennas 64-*a* and 64-*b* can be realized.

Figure 12:
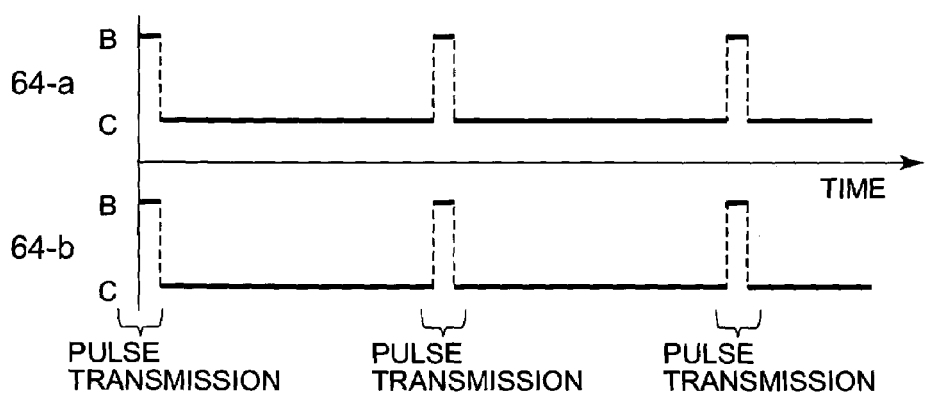
FIG. 12 is a timing chart of the operation of a transmission/reception switcher in the radar device according to Embodiment 3 of the present invention.

The antennas 64-*a* and 64-*b* radiate the pulse waves, and then the transmission/reception switchers 63-*a* and 63-*b* connect the movable terminals A to the contacts C. Consequently, the antenna 64-*a* and the receiver 66-*a*, and the antenna 64-*b* and the receiver 66-*b* are directly connected. In the meantime, the beams 65-1 and 65-2 are reflected by the target 6, and come again to the antennas 64-*a* and 64-*b* as the reflected waves 65-3 and 65-4. The antennas 64-*a* and 64-*b* receive the respective reflected waves as reception waves, and output the reception waves via the transmission/reception switchers 63-*a* and 63-*b* to the receivers 66-*a* and 66-*b*. Thus, the radar device 61 switches the transmission/reception of the antennas 64-*a* and 64-*b* by means of the transmission/reception switchers 63-*a* and 63-*b*. While the timing at which the antennas 64-*a* and 64-*b* radiate the pulse waves is arbitrary, the timing at which the antennas 64-*a* and 64-*b* receive the reflected waves is determined by relative positional relations with the target 6, and the position of the target 6 is generally not fixed. Therefore, regarding the timing at which the transmission/reception switchers 63-*a* and 63-*b* switch the movable terminals A, it is more often that the time to connect to the contacts C is longer than the time to connect to the contacts B. FIG. 12 is a timing chart for switching the movable terminals A in the transmission/reception switchers 63-*a* and 63-*b*.

Next, in the receivers 66-*a* and 66-*b*, as in the receiver 22 in Embodiment 2, the reference signals and the reception waves are converted into digital signals, to output the signals to the signal processor 67.

In the signal processor 67, the frequency analyzer 68 performs the fast Fourier transformation on the received signals, and outputs for each beam the distribution of the received signal amplitude with respect to the frequency deviation, from the received signals during a predetermined period. Then, in the signal detector 69, from the distribution of the received signal amplitude with respect to the frequency deviation, the frequency at which the received signal amplitude peaks is extracted. Moreover, the Δ/Σ angle measuring unit 12 obtains the Δ/Σ value based on the received signal amplitude extracted by the signal detector 69, and calculates the primary direction from the Δ/Σ value. The above-described processing is similar to the processing in the frequency analyzer 24, the signal detector 25, and the Δ/Σ angle measuring unit 12 in Embodiment 2, so that detailed explanations thereof will be omitted.

Next, the cluster separator 13 forms clusters based on the distribution of the primary directions, and the distribution center calculating unit 14 calculates the distribution center for each cluster. The above-described processing is the same as in Embodiment 1.

Next, the model fitting unit 70 performs the model fitting processing on the distribution centers (the integrated directions for each cluster) calculated by the distribution center calculating unit 14. It is assumed in the following description that the number of beams used for observations is m, the direction of the true target is θ, a directional pattern of a j-th (j=1, 2, . . . , m) beam is $\alpha_j(\theta)$, and the received signal actually observed in the j-th beam is $s_j$. In addition, assuming that the number of targets is n, and the reflectance ratio, the angle, the distance, of an i-th (i=1, 2, . . . , n) target, are $\gamma_i$, $\theta_i$, $r_i$, respectively, an estimate value $s'_j$ of the received signal is expressed by the equation (5).

$$s'_j = C \sum_{i=1}^{n} \gamma_i \alpha_j(\theta_i) \frac{\exp(-j2kr_i)}{r_i^4} \tag{5}$$

Here, C is a coefficient determined by the performance of the radar device.

Then, using the least-square method, $\gamma_i$ and $\theta_i$ are estimated so that the following expression is minimum.

$$\sum_{j=1}^{m} |s_j - s'_j|^2 \tag{6}$$

Here, when $\gamma_i$ and $\theta_i$ are estimated at the same time, the present least-square method is a nonlinear least-square method, so that $\gamma_i$ and $\theta_i$ are estimated by iterative refinement. Moreover, the value of the expression (6) is known as the residual sum of squares.

There is a problem in that, in the estimation processing by iterative refinement, if the selection of the initial value is not appropriate, a computation amount required in the estimation processing increases, so that the estimation processing takes time. Therefore, in the radar device 61, the distribution center of the cluster, calculated by the distribution center calculating unit 14, is used as the initial value of $\theta_i$. Because errors in the distribution center of the cluster are small, and the accuracy is sufficiently high, if the distribution center of the cluster is used as the initial value, the estimation value promptly converges. Accordingly, the computation amount can be reduced, and sufficiently efficient calculations can be performed.

Meanwhile, the reflectance ratio $\gamma_i$ has strong linearity in the least-square method, and is less dependent on the initial value in the estimation processing. Therefore, it is not necessary to give a very close value to the true value as the initial value of the reflectance ratio $\gamma_i$, and a predetermined constant value, for example, can be assigned to the initial value of the reflectance ratio $\gamma_i$.

Moreover, when $\gamma_i$ and $\theta_i$ are estimated by the model fitting, the reflectance ratio is almost zero in directions where no target is actually present, so that the reflectance ratio is small in the direction where a false image appears. Therefore, if the cluster distribution centers whose reflectance ratios are not higher than a predetermined value are rejected, a false image can be prevented from being adopted.

At the last, the model fitting unit 70 outputs as an integrated direction the $\theta_i$ estimated as described above.

Obviously from the above, according to a radar device in Embodiment 4 of the present invention, highly accurate direction estimation is performed using the method of the model fitting, and meanwhile, the distribution center of the cluster is used as the initial value in the model fitting to estimate the direction, so that the iteration count of the iterative refinement in the model fitting can be lowered, and the computation amount can be reduced.

Moreover, the model fitting unit 70 is configured so as to estimate the reflectance ratio $\gamma_i$. However, instead of the reflectance ratio $\gamma_i$, $\gamma'_i = \gamma_i/r_i^4$ may be estimated. In the equation (5), in order to regard the reflectance ratio $\gamma_i$ and the direction $\theta_i$ as parameters to be estimated, the rest of the variables must be given. Contrary to the assumption, however, the distance $r_i$ is often unknown. In such a case, given that $\gamma'_i = \gamma_i/r_i^4$ is estimated, and that $\gamma_i$ and $r_i$ are not regarded as independent variables, even if the distance $r_i$ is unknown, the estimation processing by the model fitting is applicable.

Furthermore, the model fitting unit 70 performs the model fitting on the received signal $s_i$ ($s_i$ has amplitude and phase as parameters). However, in addition to that, the model fitting can be performed on the amplitude value or the power value of the received signal. In order to perform the model fitting using the amplitude value of the received signal, instead of $s_i$ and $s'_i$, $|s_i|$ and $|s'_i|$ can be used in the expression (6). Moreover, in order to perform the model fitting using the power value of the received signal, instead of $s_i$ and $s'_i$, $|s_i|$ and $|s'_i|$ can be used in the expression (6). By performing the model fitting on the amplitude value or the power value of the received signal, it is not required to deal with the amplitude and the phase, so that the computation amount can be further reduced.

Furthermore, although the distribution center is used as the initial value of the direction, when the S/N ratio is high as described in Embodiment 1, the primary direction calculated from the received signal having the highest reception amplitude or power in the cluster can be assigned to the initial value. Moreover, as described in Embodiment 2, in the local distribution of the primary directions, the primary direction in which the characterizing quantity of the received signal is locally maximum can be assigned to the initial value.

Embodiment 4

According to Embodiment 3 described above, even when the direction estimation by the model fitting is performed, by assigning the distribution center of the cluster to the initial value, the computation amount required in estimating the reflectance ratio or the direction can be reduced. However, in addition to that, a plurality of initial direction values is given, and the estimating computations for each of the values are combined, whereby the total amount of the estimating computations by the least-square method can be reduced. A radar device according to Embodiment 4 has such a feature.

Figure 13:
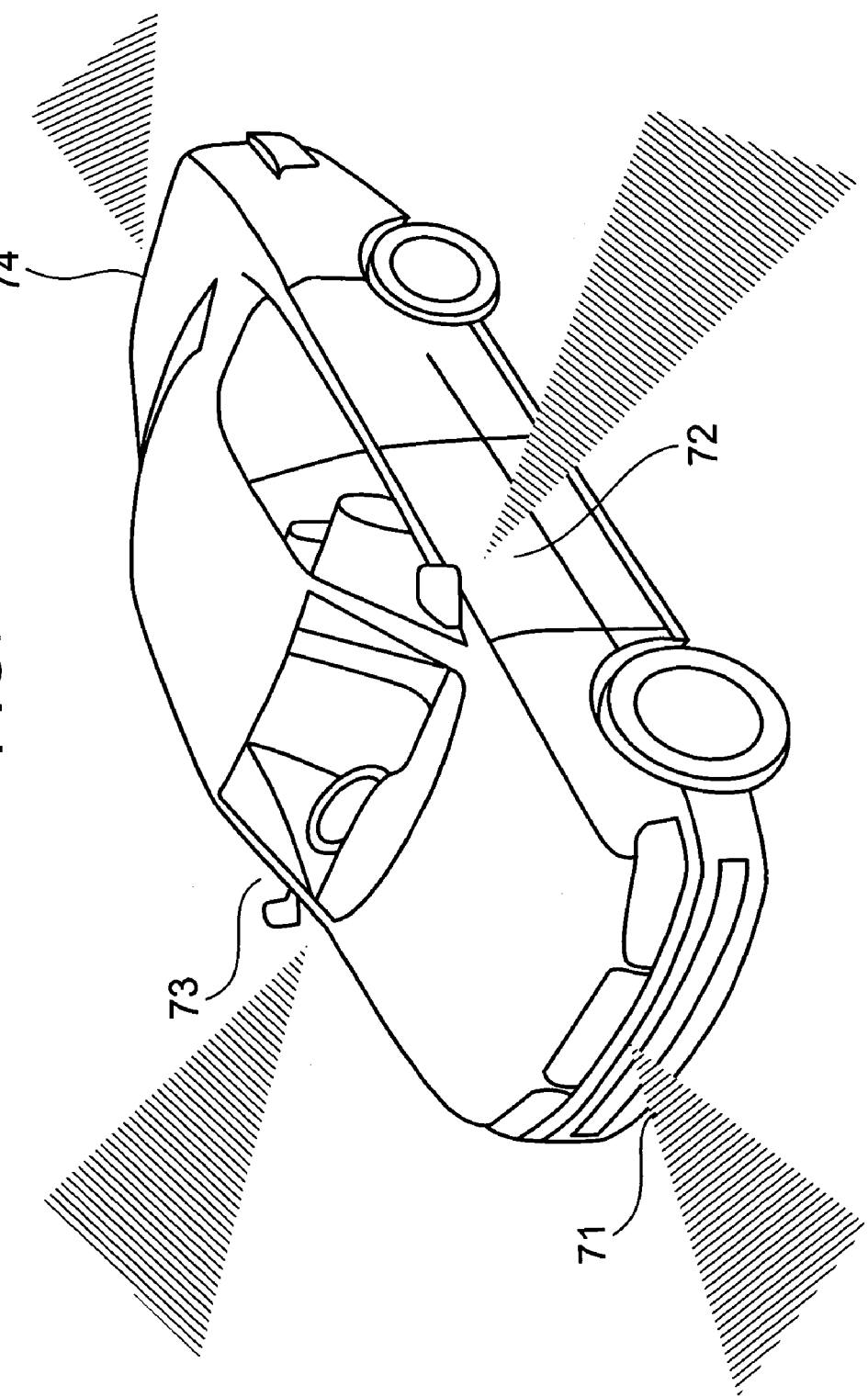
FIG. 13 is a diagram illustrating a situation in which radar devices according to Embodiment 4 of the present invention are installed in an automobile.

A radar device according to Embodiment 4 of the present invention is a radar device installed in an automobile (in-vehicle radar). An in-vehicle radar 71 installed in the front of the automobile, as illustrated in FIG. 13 for example, is used for vehicular gap control for collision prevention or cruise control. In addition, in-vehicle radars 72 and 73 installed in the sides are used for side impact detection or overtaking car detection. And an in-vehicle radar 74 installed in the rear is used for detecting rearward obstacles. If these radar devices can detect the direction of a target, the in-vehicle radar 71 installed in the front of the automobile, for example, would never detect a car driving in the adjacent lane to automatically slow down. In addition, the in-vehicle radars 72 and 73 installed in the sides could accurately detect even the position of an overtaking car to perform appropriate safety control.

Because an in-vehicle radar is often required to measure not only the position of a target but also the velocity thereof, an FMCW (frequency modulation continuous wave) radar system, which can measure the relative distance and the relative velocity with respect to its own automobile, is often adopted. Therefore, the radar device according to Embodiment 4 of the present invention is assumed to be a radar device using the FMCW system, and a method of applying the present invention to the FMCW radar will be explained.

Figure 14:
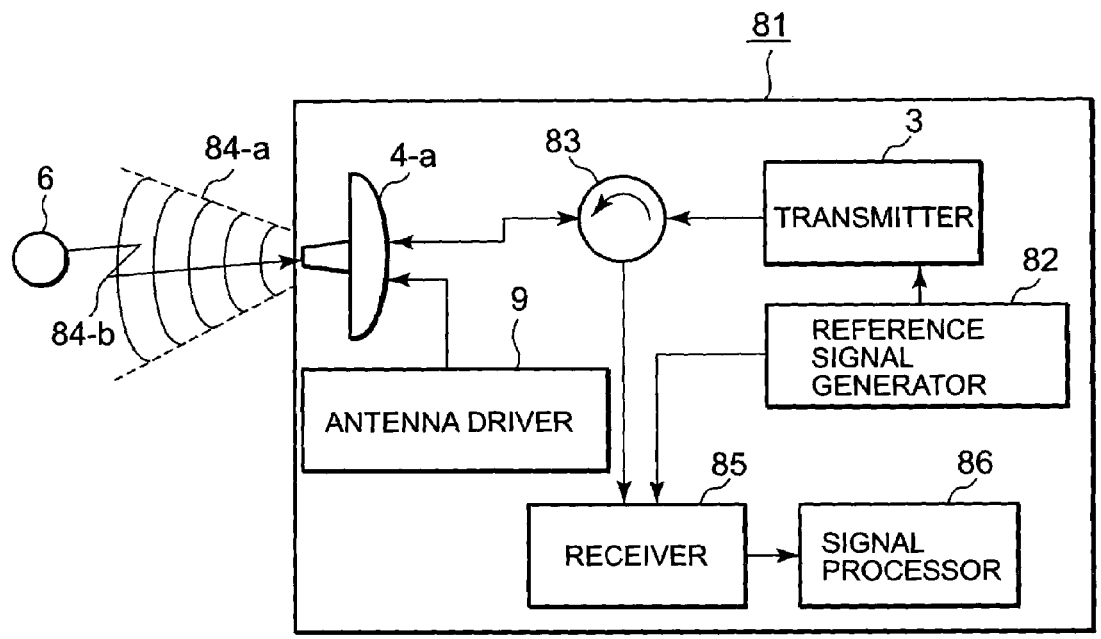
FIG. 14 is a block diagram illustrating the configuration of the radar device according to Embodiment 4 of the present invention.

FIG. 14 is a block diagram illustrating the configuration of the radar device according to Embodiment 4 of the present invention. In the diagram, the radar device 81 is an FMCW radar device. In the radar device 81, a reference signal generator 82 includes a VCO (voltage controlled oscillator), and is a component for generating a weak reference signal whose frequency periodically increases or decreases by gradation. The transmitter 3 includes an amplifier as in Embodiment 1, and is a component for amplifying the weak reference signal into the transmission signal. A transmission/reception switcher 83 is a circulator for outputting the reception signal outputted from the transmitter 3 to the antenna 4-$a$, and for outputting at the same time the reflected wave outputted from the antenna 4-$a$ to a later-described receiver 85.

The antenna 4-$a$ and the antenna driver 9 are similar to those in Embodiment 1, so that the explanations thereof will be omitted. Because the radar device 81 is an FMCW radar, the radar device is configured so as to radiate a beam 84-$a$ composed of an up phase and a down phase (or an up chirp and a down chirp) toward the target 6, and to receive the reception wave 84-$b$ that reaches the antenna 4-$a$ after a portion of the beam has been reflected by the target 6. The receiver 85 includes a mixer, and is a component for generating a beat signal composed of the received reception wave and the reference signal generated by the reference signal generator 82, and further for converting the beat signal into digital signal, to output the converted signal. The beat signal is generated for each target in each phase. Therefore, in a case in which, in one phase, beams have been radiated toward N targets, and then beat signals are obtained from the reception waves reflected by the targets, N beat signals will be generated. A signal processor 86 is a component for processing the beat signals to calculate the relative distance and the relative velocity, which is a feature of the FMCW radar, and for measuring the direction of the target, which is an object of the present invention. The detailed configuration thereof is illustrated by a block diagram in FIG. 15.

Figure 15:
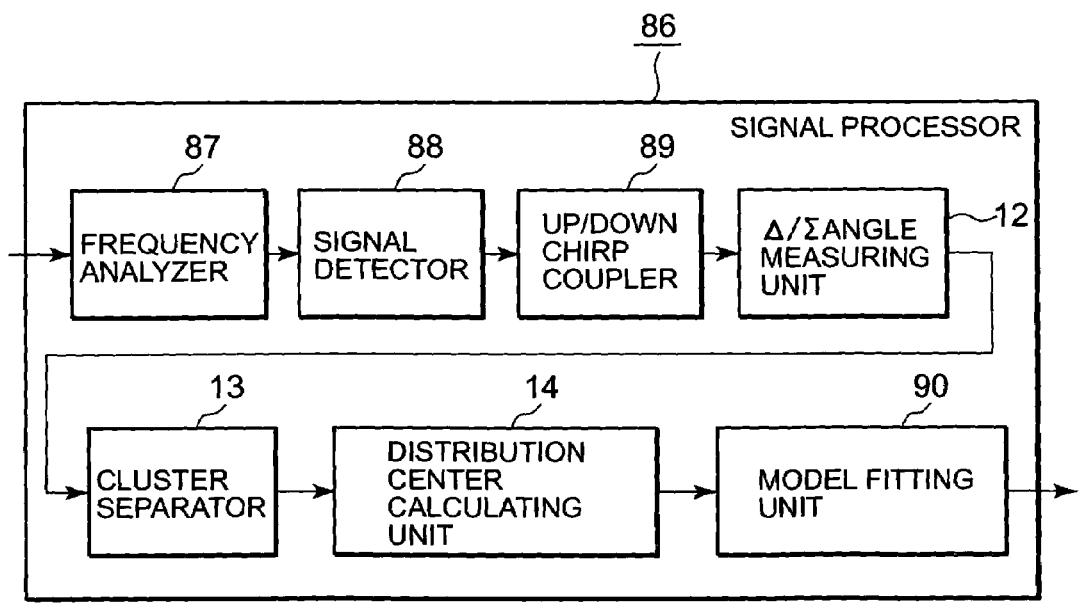
FIG. 15 is a block diagram illustrating the detailed configuration of a signal processor in the radar device according to Embodiment 4 of the present invention.

In FIG. 15, a frequency analyzer 87 is a component for performing frequency analysis of the beat signal. A signal detector 88 is a component for extracting, from the frequency distribution analyzed by the frequency analyzer 87, quantities characterizing the beat signal such as the frequency and the amplitude of the beat signal. An up/down chirp coupler 89 is a component for generating pairs of (for coupling) beat signals from the beat signals in the up phase (up chirp) and the beat signals in the down phase (down chirp).

Subsequently, the Δ/Σ angle measuring unit 12, the cluster separator 13, and the distribution center calculating unit 14 are similar to those in Embodiment 1, so that the explanations thereof will be omitted. At the last, a model fitting unit 90 is a component for performing the model fitting on the distribution center of the cluster. Here, in FIG. 15, the components required for calculating the direction of the target using the FMCW radar are illustrated, and the illustrations and explanations of the components required for calculating the relative distance or the relative velocity are omitted.

Next, the operations of the radar device 81 will be described. Although the radar device 81 is a radar device using an FMCW system, the operations of the reference signal generator 82 through the receiver 85 are similar to the operations of the corresponding components in the pulse radar device described in Embodiment 1, so that the explanations will be omitted. However, as described above, the receiver 85 differs in outputting the beat signal to the signal processor 86.

In the signal processor 86, the frequency analyzer 87 generates the frequency distribution of the beat signal by means of the fast Fourier transformation or the like, and the signal detector 88 extracts from the frequency distribution the frequencies of the beat signals. The up/down chirp coupler 89 generates pairs of up-phase beat signal frequencies and down-phase beat signal frequencies extracted by the signal detector. The reason is as follows.

The radar device 81 is an FMCW radar device, in which, when a pair of an up-phase beat signal and an down-phase beat signal is obtained, the relative velocity and the relative distance are calculated. Specifically, given that the frequency of the up-phase beat signal is U, the frequency of the down-phase beat signal is D, a frequency sweep width is B, a modulation time is T, the light velocity is c, and the wavelength of the transmission wave is λ, the relative distance R and the relative velocity V of the target are given by equations (7) and (8), respectively.

$$R = \frac{cT}{4B}(D - U) \quad (7)$$

$$V = \frac{\lambda}{4}(D + U) \quad (8)$$

As described above, it is necessary to determine U and D for calculating R and V. Meanwhile, it is understandable that, when N targets are present, N beat signals are present in each of the up phase and the down phase, and that the values of R and V completely vary depending on which up-phase beat signal and which down-phase beat signal are combined to be assigned in the equation (7) and the equation (8). Therefore, when a plurality of targets is present, it is important to obtain correct combinations of the up-phase beat signals and the down-phase beat signals in order to calculate the relative distance and the relative velocity for each target. The up/down chirp coupler 89 performs such processing. Here, regarding methods of obtaining correct combinations of the up-phase beat signals and the down-phase beat signals in the FMCW radar when a plurality of targets is present, several publicly known methods have already been presented (for example, Japanese Patent Laid-Open No. 142337/1993 "Millimeter-wave radar distance/velocity measurement device"), so that the explanations thereof will be omitted here.

Next, the Δ/Σ angle measuring unit 12 obtains the Δ/Σ value based on the amplitude values of the beat signals, and calculates the primary directions of the targets. Subsequent processings in the cluster separator 13 and the distribution center calculating unit 14 are similar to those in Embodiment 1, so that the explanations thereof will be omitted.

Figure 16:
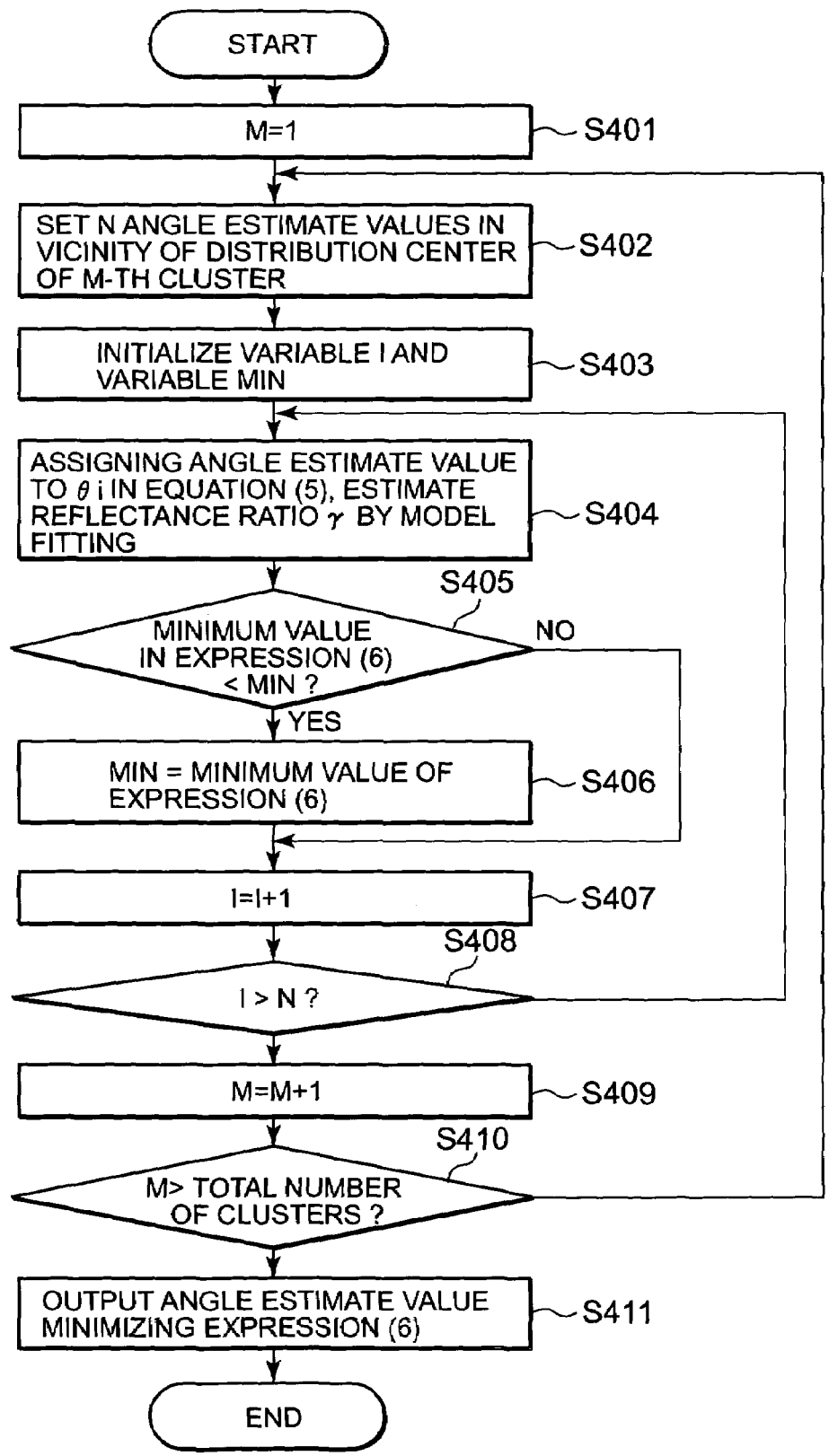
FIG. 16 is a flowchart illustrating the operation of a model fitting unit in the radar device in Embodiment 4 of the present invention.
Figure 17:
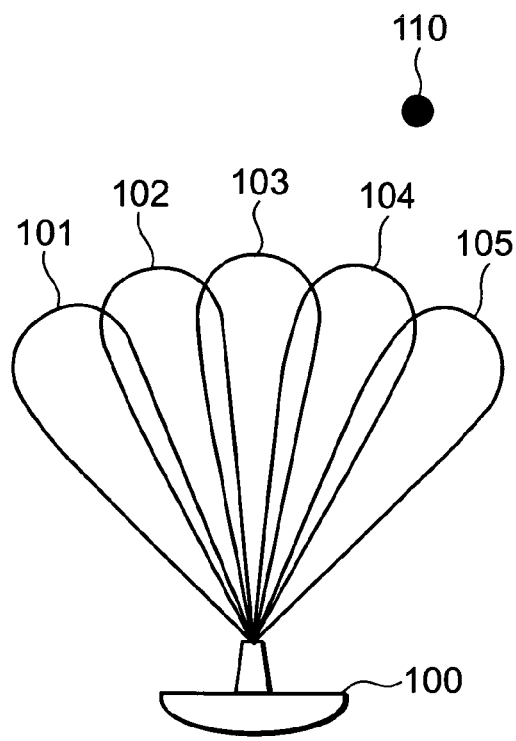
FIG. 17 is a diagram illustrating relations among beam patterns and a target in a conventional technology.
Figure 18:
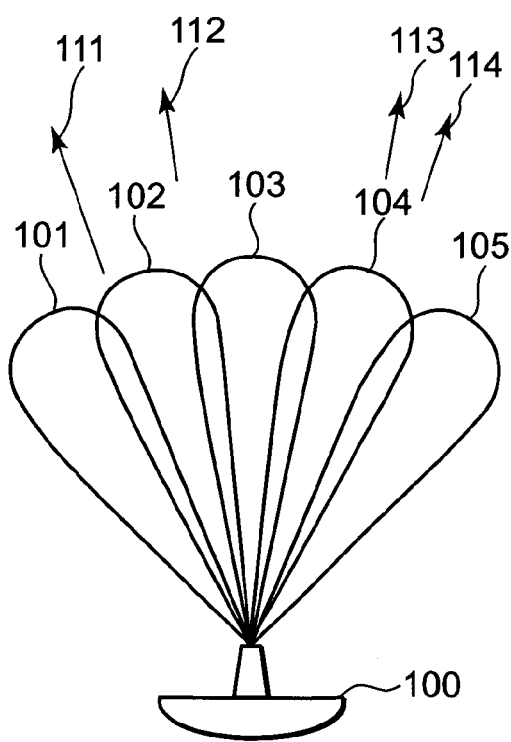
FIG. 18 is a diagram illustrating relations among the beam patterns and the directions calculated thereby in the conventional technology

Next, the model fitting unit 90 performs the model fitting between a received signal $s_j$ at the distribution center of the cluster and an estimated value $s'_j$. FIG. 16 is a flowchart illustrating the model fitting processing in the model fitting unit 90. Firstly, in step S401 in FIG. 16, the model fitting unit 90 initializes a counter variable M to 1. In the subsequent processing, the counter variable M is used for identifying a cluster.

Next, in step S402, the model fitting unit 90 sets for an M-th cluster a predetermined number of angle estimate values in an area in the vicinity of the distribution center of the cluster. It is assumed that N angle estimate values (N is a natural number) are selected here. As a method of setting the angle estimate values, for example, a method of selecting, from the primary directions belonging to the M-th cluster, N primary directions in ascending order of the distance from the distribution center as the angle estimate values is available.

In step S403, a counter variable I and a variable MIN are initialized. As the initial value of the counter variable I, 1 is given. The counter variable I is used for identifying one of the N angle estimate values. The variable MIN is a storage area for calculating the minimum value. Any value can be the initial value thereof as long as the value is a certain level of a large value that cannot be the minimum value. Next, in step S404, given that an I-th angle estimate value is $θ_i$, the $s'_j$ is calculated according to the equation (5), and only the reflectance ratio $γ_j$ is iteratively refined in the least-square method according to the expression (6), whereby the model fitting is performed. As described in Embodiment 3, the reflectance ratio $γ_j$ has strong linearity, so that the estimate value promptly converges. Consequently, the reflectance ratio where the value of the expression (6) (residual sum of squares) is minimum is obtained by the iterative refinement. In step S405, whether or not the minimum value obtained in step S404 is smaller than the MIN is checked. If the minimum value is smaller than the MIN, it means that, in the cluster, the minimum value according to the current angle estimate value is smaller than the minimum value obtained using the previous angle estimate value. Then in this case, step S406 ensues (step S405: Yes), in which the current residual sum of squares calculated in the expression (6) is assigned to the variable MIN, and the current angle estimate value is stored in memory. In addition, the minimum value of the expression (6) and the angle estimate value from which the minimum value is obtained are stored in a storage area allocated for each cluster. After that, step S407 ensues.

In the meanwhile, in step S405, if the minimum value obtained in step S404 is not smaller than the MIN, the minimum value cannot be adopted as the minimum value of the whole cluster, so that step S407 directly ensues (step S405: No).

Next, in step S407, the variable I is incremented by 1. In the following step S408, whether or not the variable I exceeds the N is judged, if the variable I is N or smaller, step S404 recurs (step S408: No). Meanwhile, if the variable I has exceeded the N, no more angle estimate value is present in the cluster, so that the processing for the next cluster is performed. Specifically, step S409 ensues (step S408: Yes), and the M is incremented by 1. In step S410, whether the M has exceeded the total number of the clusters is judged. As a result, if the M is the total number of the clusters or smaller, there remain clusters to be processed, so that step S402 recurs to process the next cluster (step S410: No). Moreover, if the M has exceeded the total number of the clusters, no more cluster to be processed is present, so that step S411 ensues (step S410: Yes).

In step S411, the model fitting unit 90 outputs the angle estimate value that minimizes the expression (6), obtained for each cluster.

It is obvious from the above description that, according to a radar device in Embodiment 5 of the present invention, by fixing to a plurality of angle estimate values the angle components that are difficult to estimate without using the non-linear least-square method, the iterative refinement computation for the angle components can be eliminated, so that the computation amount can be further reduced.

In addition, given that the above-described number N of the angle estimate values is 1, the model fitting can be performed only on the reflectance ratio, and, as a result, only the clusters that measure up to predetermined conditions can be selected. For example, given that only a single primary direction is selected for each cluster (this is the angle estimate value), the angle component in the equation (5) is fixed to the primary direction, and the model fitting is performed only on the reflectance ratio, only when the reflectance ratio is the reference value or higher, the angle estimate value can be adopted as an integrated direction. Moreover, it is obvious that, instead of the primary direction, the distribution center can be used.

Furthermore, given that only a single distribution center or a single primary direction is selected as the angle estimate value in the same manner, and the model fitting is performed only on the reflectance ratio, as a result, when the value of the expression (6) is larger than a predetermined value, the primary direction for the cluster can be rejected. If the expression (6) (residual sum of squares) is not sufficiently small, it means that the accuracy of the assumed target direction, or of the cluster angle measurement value is low, so that rejecting such a value can enhance the angle measurement accuracy.

INDUSTRIAL APPLICABILITY

As described above, a radar device relevant to the present invention is useful in measuring the directions of a plurality of targets.

What is claimed is:

1. A radar device including:
an antenna for radiating beams in a plurality of directions and for receiving as reception waves the beams having been reflected by targets;
a receiver for performing detection processing on the reception waves received by the antenna, to output received signals;
a signal detector for extracting from the received signals outputted by the receiver quantities characterizing the reception waves; and
a direction calculating unit for calculating a primary direction, being the direction of a target, from a combination of the characterizing quantities calculated by the signal detector based on the reception waves from at least two beams that partially overlap, among the beams radiated in the plurality of directions; the radar device characterized by
a direction integrating unit for, when a plurality of primary directions calculated by the direction calculating unit is present, calculating an integrated direction, being the true target direction, from an area in which the density in a distribution of the plurality of primary directions is a predetermined value or greater, the integrated direction calculation being based on the primary directions belonging to the area.

2. A radar device according to claim 1, wherein the direction integrating unit forms a cluster from the primary directions belonging to the area in which the density is a predetermined value or greater, and calculates the integrated direction in units of that cluster.

3. A radar device according to claim 2, wherein, when the angular difference between two of the primary directions is a predetermined value or greater, the direction integrating unit assigns the two target directions to different clusters.

4. A radar device according to claim 2, wherein the direction integrating unit obtains a distribution center of a plurality of primary directions belonging to the cluster, and outputs the distribution center as the integrated direction of the cluster.

5. A radar device according to claim 4, wherein the direction integrating unit obtains the distribution center based on angles of the primary directions belonging to the cluster, each weighted by the reception-wave characterizing quantity used in calculating the primary direction.

6. A radar device according to claim 5, wherein the direction integrating unit performs weighting by using the reception amplitude of the reception wave as the reception-wave characterizing quantity.

7. A radar device according to claim 5, wherein the direction integrating unit performs weighting by using the reception power of the reception wave as the reception-wave characterizing quantity.

8. A radar device according to claim 2, wherein the direction integrating unit designates as the integrated direction of the cluster the target direction where the reception-wave reception amplitude used in calculating the primary direction belonging to the cluster is maximum.

9. A radar device according to claim 2, wherein the direction integrating unit designates as the integrated direction of the cluster the primary direction where the reception-wave reception power used in calculating the primary direction belonging to the cluster is maximum.

10. A radar device according to claim 1, wherein the direction integrating unit obtains strength of the integrated direction, and outputs the integrated direction if the strength satisfies a predetermined condition.

11. A radar device according to claim 10, wherein the direction integrating unit obtains as the strength of the integrated direction the total sum of reception-wave reception amplitudes used in calculating the primary directions belonging to an area.

12. A radar device according to claim 10, wherein the direction integrating unit obtains as the strength of the integrated direction the mean value of reception-wave reception amplitudes used in calculating the primary directions belonging to an area.

13. A radar device according to claim 10, wherein the direction integrating unit obtains as the strength of the integrated direction the mean value of the reception-wave reception powers used in calculating the integrated direction.

14. A radar device according to claim 10, wherein, if the strength of the integrated direction is a predetermined value or greater, the direction integrating unit outputs the integrated direction.

15. A radar device according to claim 2, wherein the direction integrating unit obtains, based on the number of the primary directions belonging to the cluster, strength of the integrated direction of the cluster, and outputs the integrated direction if the strength satisfies a predetermined condition.

16. A radar device according to claim 2, wherein the direction integrating unit selects a predetermined number of the integrated directions in descending order of the strength, and outputs the selected integrated directions.

17. A radar device according to claim 2, wherein the direction integrating unit estimates, assigning the calculated integrated direction to an initial value of an angle component, the target directions by performing model fitting on model reception signals that are preset assuming the angle and reflectance ratio of the target, and the received signals used in calculating the primary direction by the direction calculating unit.

18. A radar device according to claim 17, wherein the direction integrating unit selects from the primary directions belonging to the cluster a predetermined number of primary directions, and performs the model fitting for estimating the reflectance ratio using a least-square method assuming one of the selected primary directions as the angle component.

19. A radar device according to claim 18, wherein, if the reflectance ratio estimated by the model fitting is a predetermined value or greater, the direction integrating unit estimates the target direction with respect to the cluster.

20. A radar device according to claim 18, wherein the direction integrating unit rejects an integrated direction calculated from the cluster where the minimum value of a residual sum of squares in the model fitting is a predetermined value or greater.

21. A radar device including:
an antenna for radiating beams in a plurality of directions and for receiving as reception waves the beams having been reflected by targets;
a receiver for performing detection processing on the reception waves received by the antenna, to output received signals;
a signal detector for extracting from the received signals outputted by the receiver quantities characterizing the reception waves; and
a direction calculating unit for calculating a primary direction, being the direction of a target, from a combination of the characterizing quantities calculated by the signal detector based on the reception waves from at least two beams that partially overlap, among the beams radiated in the plurality of directions; the radar device characterized by
a direction integrating unit for, when a plurality of primary directions calculated by the direction calculating unit is present, calculating an integrated direction, which is the true target direction, from an area in which the density in a distribution of the reception-wave characterizing quantities used in calculating the plurality of primary directions is a predetermined value or greater, the integrated direction calculation being based on the target directions belonging to the area.

22. A radar device according to claim 21, wherein the direction integrating unit obtains the density in a distribution of the reception-wave reception amplitude used in calculating the primary direction, and outputs as the integrated direction the angle where the distribution density is locally maximum.

23. A radar device according to claim 22, wherein the direction integrating unit obtains the distribution density by setting a window function for smoothing the reception-wave reception amplitude.

* * * * *